United States Patent
Momose et al.

(10) Patent No.: US 9,316,516 B2
(45) Date of Patent: Apr. 19, 2016

(54) MAGNETIC EXCITATION CIRCUIT FOR ELECTROMAGNETIC FLOW METER

(71) Applicant: Azbil Corporation, Tokyo (JP)

(72) Inventors: Osamu Momose, Tokyo (JP); Ichiro Mitsutake, Tokyo (JP); Shinsuke Matsunaga, Tokyo (JP); Taka Inoue, Tokyo (JP); Masahide Ushiyama, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 147 days.

(21) Appl. No.: 14/192,855

(22) Filed: Feb. 27, 2014

(65) Prior Publication Data

US 2014/0247532 A1    Sep. 4, 2014

(30) Foreign Application Priority Data

Mar. 1, 2013   (JP) .................................. 2013-040431

(51) Int. Cl.
  *G01F 1/60*    (2006.01)
  *G01F 1/58*    (2006.01)

(52) U.S. Cl.
  CPC . *G01F 1/60* (2013.01); *G01F 1/586* (2013.01)

(58) Field of Classification Search
  CPC ........................... H01H 47/325; H01H 47/002
  USPC .......................................................... 361/154
  See application file for complete search history.

(56) References Cited

U.S. PATENT DOCUMENTS 7,310,582 B2    12/2007    Ishikawa
2006/0032316 A1*    2/2006    Ishikawa ................... G01F 1/60
                                                              73/861.11

FOREIGN PATENT DOCUMENTS

JP    2006-170968 A    6/2006

* cited by examiner

*Primary Examiner* — Dharti Patel
(74) *Attorney, Agent, or Firm* — Troutman Sanders LLP

(57) ABSTRACT

A magnetic excitation circuit is used as a circuit for providing a magnetic excitation electric current based on a magnetic excitation power supply voltage to a magnetic excitation coil of an electromagnetic flow meter. The magnetic excitation circuit includes four voltage storing circuits that store and output a driving voltage that is charged by a common driving voltage. The voltage storing circuits are connected respectively between the control terminals and the output terminals of four switching elements. When the four switching elements are turned ON in relation to a positive interval or a negative interval, the four switching elements operate by the driving voltages that are outputted from the respective voltage storing circuits.

2 Claims, 16 Drawing Sheets

Background Art

Background Art

MAGNETIC EXCITATION CIRCUIT FOR ELECTROMAGNETIC FLOW METER

CROSS REFERENCE TO RELATED APPLICATION

This application claims priority under 35 U.S.C. §119 to Japanese Patent Application No. 2013-040431, filed on Mar. 1, 2013, the entire content of which being hereby incorporated herein by reference.

FIELD OF TECHNOLOGY

The present invention relates to an electromagnetic flow meter, and, in particular, relates to a technology for a magnetic excitation circuit for providing a magnetic excitation electric current to a magnetic excitation coil of a detector.

BACKGROUND

Typically, in electromagnetic flow meters for measuring the flow rate of a fluid that is electrically conductive, the flow rate of the fluid that flows within a measurement pipe is measured by providing a magnetic excitation electric current that alternatingly switches polarities to a magnetic excitation coil that is disposed so that the direction of the magnetic field that is produced is perpendicular to the direction of flow of the fluid that is flowing within the measurement pipe, to detect the electromotive force that is produced between a pair of electrodes that are disposed within the measurement pipe perpendicular to the magnetic field produced by the magnetic excitation coil, and sampling and performing signal processing after amplifying the electromotive force that is produced between the electrodes.

Conventionally, in a magnetic excitation circuit for providing a magnetic excitation electric current to a magnetic excitation coil, the ramp up of the excitation magnetic field at the time of switching the excitation magnetism polarity, has been hastened through performing, conventionally, a method wherein two power supplies, high voltage and low voltage, are prepared in advance, where the magnetic excitation is performed using the high voltage when ramping up the magnetic excitation electric current, and then performing magnetic excitation with the low voltage otherwise. See, for example, Japanese Unexamined Patent Application Publication No. 2006-170968.

FIG. 14 is a block diagram illustrating a configuration for a conventional electromagnetic flow meter.

In a power supply circuit 91 for this electromagnetic flow meter 9, after the commercial AC power ACIN has been rectified, it is converted to high-frequency through a switching controlling circuit and supplied to the primary side coil of a transformer, and is rectified by a rectifying circuit that is provided on the secondary side coil of the transformer, after which the rectified power is stabilized by a voltage regulator, to provide various DC voltages to a controlling circuit 92 and a magnetic excitation circuit 93.

FIG. 15 is a circuit diagram illustrating a conventional magnetic excitation circuit. FIG. 16 is a signal waveform diagram illustrating the operation of the conventional magnetic excitation circuit.

This magnetic excitation circuit 93 switches, through a power MOSFET or through switching elements Q1 through Q4 that are made from analog switches, the polarities of the magnetic excitation power supply voltages VexH and VexL that are supplied from the power supply circuit 91, and provides them to a magnetic excitation coil Lex.

The power supply voltages for magnetic excitation can be selected as either VexH or VexL, from the high voltage VexH (for example, 30 V) or a low voltage VexL that is lower than the voltage of VexH (for example, 15 V), by a switch SW being switched by a voltage switching signal EXD1 from a CPU (not shown) within the controlling circuit 92.

Moreover, when it comes to the magnetic excitation polarity applied to the magnetic excitation coil Lex, the magnetic excitation polarity is switched through Q1 and Q4, from among the switching elements Q1 through Q4, being turned ON or OFF synchronously as a positive polarity pair, and Q2 and Q3 being turned ON and OFF synchronously, in the opposite phase from the positive polarity pair, as a reverse polarity pair, through one of the polarity switching signals EXD1 or EXD2 from the CPU.

As illustrated in FIG. 16, putting the power supply voltage for magnetic excitation to the high voltage VexH immediately after switching the magnetic excitation polarity increases the speed with which the magnetic excitation electric current Iex ramps up, and then, after a specific amount of time has elapsed after switching the magnetic excitation polarity, reducing the power consumption by switching the power supply voltage for magnetic excitation to the low voltage of VexL prevents heating of the transistor Q5, made from a power MOSFET, in the constant current circuit CCS. Note that the FIG. 16 illustrates an example wherein the ratio between the high-voltage interval TH and the low-voltage interval TL of the power supply voltages for magnetic excitation is set to 50:50, regardless of the ramp up of the magnetic excitation electric current Iex.

Of the switching elements Q1 through Q4, during the positive interval TP when Q1 is ON, when the ground electropotential VexCOM is set to the reference level (0 V), then point B, that is, the source electropotential VB of Q1 will be as illustrated in FIG. 16, and the power supply voltage for magnetic excitation will be about 30 V during the high voltage VexH high-voltage interval TH, and about 15 V during the low voltage VexL low-voltage interval TL. This is also true for point C, that is, the source voltage VC for Q3, during the negative interval TN when Q3 is ON.

On the other hand, during the negative interval TN when Q2 is ON, point D, that is, the source electropotential VD for Q2, will be 0 V until the magnetic excitation current Iex goes up, and thereafter the magnetic excitation electric current limitation by the constant current circuit CCS (for example, constant at 100 mA) will operate so that the power supply voltage for magnetic excitation will change to between 15 and 30 V of the high voltage VexH during the high-voltage interval TH, and change to between 0 and 15 V of the low voltage VexL during the low-voltage interval TL. This is true also during the positive interval TP when Q4 is ON. Note that the central voltage of VD is changed by the value of the resistance of the magnetic excitation coil Lex.

Typically, in order to turn a power MOSFET ON (to make the drain-source resistance RDS essentially 0Ω), it has been necessary for the gate-source voltage VGS to be a voltage that is adequately high compared to the threshold value of several volts, and to be a voltage that has margin in relation to the absolute maximum rating for VGS (which is typically between 20 and 30 V), and so normally a VGS of about 10 V has been used.

On the other hand, in the conventional technology, illustrated in FIG. 15, the source electropotential of the individual power MOSFETs that structure the switching elements Q1 through Q4 will vary greatly due to the switching of the power supply voltage for magnetic excitation, as described above, that is, due to the switching between the high voltage VexH (30 V) and the low voltage VexL (15 V).

Consequently, in order to maintain VGS=10 V regardless of the power supply voltage for magnetic excitation, three insulated power supplies (10 V×3), insulated from the ground voltage VexCOM, are necessary.

That is, in FIG. 15, Q1 is driven by an insulated power supply VexG1 (10 V)/VexG1COM (0 V), by a photocoupler PC1 that is operated by the polarity switching signal EXD1, and Q3 is driven by an insulated power supply VexG2 (10 V)/VexG2COM (0 V), by a photocoupler PC3 that is operated by the polarity switching signal EXD2.

Moreover, in FIG. 15, Q2 is driven by an insulated power supply VexG3 (10 V)/VexG3COM (0 V), by a photocoupler PC2 that is operated by the polarity switching signal EXD2, and Q4 is driven by an insulated power supply VexG3 (10 V)/VexG3COM (0 V), by a photocoupler PC4 that is operated by the polarity switching signal EXD1.

Because of this, as illustrated in FIG. 14, it is necessary to provide the magnetic excitation circuit 93 in the power supply circuit 91 by producing these three insulated power supplies by increasing the number of secondary side coils in the transformer and the number of secondary side rectifying circuits, and thus there is a problem in that this makes cost increases in the power supply circuit 91 unavoidable.

The present invention was created to solve problems such as these, and an aspect thereof is to provide a magnetic excitation circuit technology that can drive a switching element for switching the magnetic excitation polarity without requiring an insulated power supply.

SUMMARY

In order to achieve such an aspect, a magnetic excitation circuit according to the present invention is a magnetic excitation circuit used as a circuit for providing a magnetic excitation electric current based on a magnetic excitation power supply voltage to a magnetic excitation coil of an electromagnetic flow meter, wherein the magnetic excitation electric current is switched to positive polarity/negative polarity with each positive interval/negative interval that are repeated with a specific period, where, at the times of the beginnings of these positive interval and negative interval the magnetic excitation power supply voltage is switched to a high voltage during a high-voltage interval, and after a specific time interval has elapsed after the starting time, the magnetic excitation power supply voltage is switched to a low voltage over a low-voltage interval. The magnetic excitation circuit includes first and fourth switching elements that provide a magnetic excitation electric current that is switched to a positive polarity through turning ON during the positive interval and turning OFF during the negative interval, second and third switching elements that provide a magnetic excitation electric current that is switched to a negative polarity through turning OFF during the positive interval and turning ON during the negative interval, a constant current circuit that controls the magnetic excitation electric current to a specific value, and voltage storing circuits, which store and output a driving voltage that is charged by a common driving voltage, connected individually between the respective controlling terminals and output terminals of the first through fourth switching elements to enable operation by a driving voltage that is outputted from the respective voltage storing circuits when the first through fourth switching elements are turned ON with the positive interval/negative interval.

Another magnetic excitation circuit according to the present invention is a magnetic excitation circuit used as a circuit for providing a magnetic excitation electric current based on a magnetic excitation power supply voltage to a magnetic excitation coil of an electromagnetic flow meter, wherein the magnetic excitation electric current is switched to positive polarity/negative polarity with each positive interval/negative interval that are repeated with a specific period, where, at the times of the beginnings of these positive interval and negative interval the magnetic excitation power supply voltage is switched to a high voltage during a high-voltage interval, and, thereafter, in response to the ramping up of the magnetic excitation current, the magnetic excitation power supply voltage is switched to a low voltage. The another magnetic excitation circuit includes first and fourth switching elements that provide a magnetic excitation electric current that is switched to a positive polarity through turning ON during the positive interval and turning OFF during the negative interval, second and third switching elements that provide a magnetic excitation electric current that is switched to a negative polarity through turning OFF during the positive interval and turning ON during the negative interval, a constant current circuit that controls the magnetic excitation electric current to a specific value, and voltage storing circuits, which store and output a driving voltage that is charged by a common driving voltage, connected individually between the respective controlling terminals and output terminals of the first through fourth switching elements to enable operation by a driving voltage that is outputted from the respective voltage storing circuits when the first through fourth switching elements are turned ON with the positive interval/negative interval.

Moreover, in one example configuration of a magnetic excitation circuit as set forth in the present invention, in the first switching element, the input terminal is connected to the magnetic excitation power supply voltage, the output terminal is connected to one end of the magnetic excitation coil, and, between the control terminal and the output terminal, a first voltage storing circuit that sores and outputs a driving voltage that is charged by a common driving voltage, and the output of a first photocoupler that is turned OFF during the positive interval and turned ON during the negative interval, are connected in parallel. Also, in the second switching element, the input terminal is connected to one end of the magnetic excitation coil, the output terminal is connected to the input terminal of the constant current circuit, and, between the control terminal and the output terminal, a second voltage storing circuit that stores and outputs a driving voltage that is charged by a common driving voltage, and the output of a second photocoupler that is turned ON during the positive interval and turned OFF during the negative interval, are connected in parallel. In addition, in the third switching element, the input terminal is connected to the magnetic excitation power supply voltage, the output terminal is connected to the other end of the magnetic excitation coil, and, between the control terminal and the output terminal, a third voltage storing circuit that stores and outputs a driving voltage that is charged by a common driving voltage, and the output of a third photocoupler that is turned ON during the positive interval and turned OFF during the negative interval, are connected in parallel. Further, in the fourth switching element, the input terminal is connected to the other end of the magnetic excitation coil, the output terminal is connected to the input terminal of the constant current circuit, and, between the control terminal and the output terminal, a fourth voltage storing circuit that stores and outputs a driving voltage that is charged by a common driving voltage, and the output of a fourth photocoupler that is turned OFF during the positive interval and turned On during the negative interval, are connected in parallel.

Moreover, in one example configuration of a magnetic excitation circuit as set forth in the present invention, in the first switching element, a first delaying capacitive element, which delays the first switching element turning ON, is connected between the control terminal and the output terminal, and in the third switching element, a second delaying capacitive element, which delays the third switching element turning ON, is connected between the control terminal and the output terminal.

Moreover, in one example configuration of a magnetic excitation circuit as set forth in the present invention, the first through fourth photocouplers are turned ON/OFF, with the positive interval/negative interval, by the respective first through fourth polarity switching signals which are provided respectively separately, and of these, the first photocoupler is turned OFF after a delay of a specific delay time interval at the time of the start of the positive interval, by the first polarity switching signal, and the third photocoupler is turned OFF after a delay of a specific delay time interval at the time of the start of the negative interval, by the third polarity switching signal.

Moreover, one example configuration of a magnetic excitation circuit as set forth in the present invention further includes a charging capacitive element that is connected in common to the input terminals of the first and third switching elements and provides, as the high voltage, a charge voltage obtained by charging by a reverse electromotive force that is produced in the magnetic excitation coil at the time of switching of the polarity of the magnetic excitation electric current, and a reverse flow preventing diode. In this example configuration, the anode terminal is connected to the magnetic excitation power supply voltage and the cathode terminal is connected in common to the input terminals of the first and third switching elements, to prevent reverse flow of the reverse electromotive force to the magnetic excitation power supply voltage, and to provide, to the input terminals of the first and third switching elements, the magnetic excitation power supply voltage in response to a drop in the charging voltage.

The present invention, as a driving power supply for driving individual switching elements, makes it possible to drive individual switching elements through a driving voltage that is stored by a voltage storing circuit provided for each individual switching element together with switching between the positive interval and the negative interval, without requiring individual insulated power supplies as the driving power supplies for the respective switching elements. Because of this, this makes it possible to avoid the cost increases in the power supply circuit, because it eliminates the need, in the power supply circuit, to increase the number of secondary side coils in the transformer and the number of secondary side rectifying circuits to produce a plurality of insulated power supplies.

BRIEF DESCRIPTIONS OF THE DRAWINGS

DETAILED DESCRIPTION

Forms for carrying out the present invention will be explained next in reference to the figures.

Example

Figure 1:
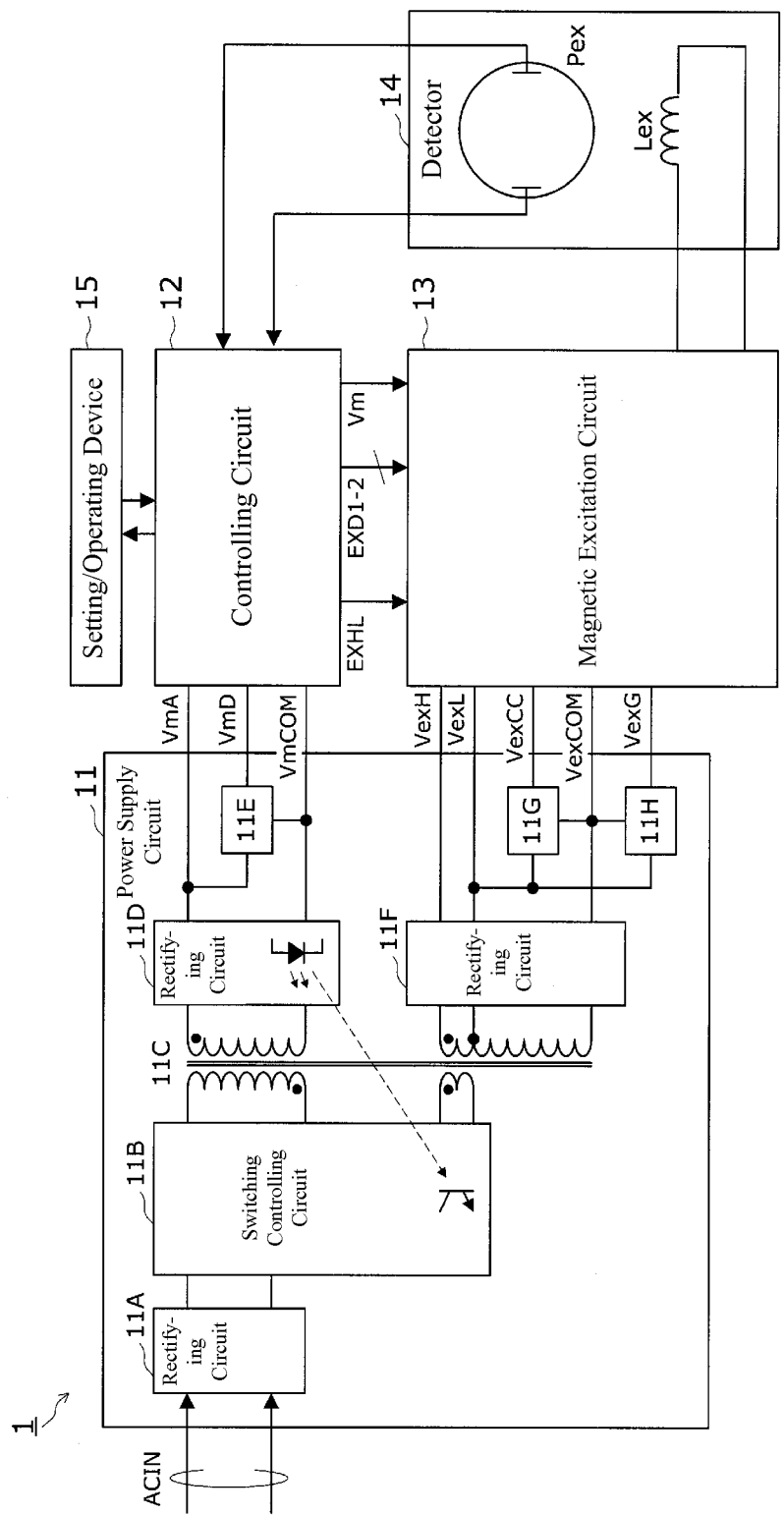
FIG. 1 is a block diagram illustrating the structure of an electromagnetic flow meter according to Example.

An electromagnetic flow meter 1 according to Example according to the present invention will be explained first in reference to FIG. 1. FIG. 1 is a block diagram illustrating a structure of an electromagnetic flow meter according to the Example.

This electromagnetic flow meter 1 has a function for measuring the flow rate of a fluid that has electrical conductivity. Typically, in electromagnetic flow meters for measuring the flow rate of a fluid that is electrically conductive, the flow rate of the fluid that flows within a measurement pipe is measured by providing a magnetic excitation electric current that alternatingly switches polarities to a magnetic excitation coil that is disposed so that the direction of the magnetic field that is produced is perpendicular to the direction of flow of the fluid that is flowing within the measurement pipe, to detect the electromotive force that is produced between a pair of electrodes that are disposed within the measurement pipe perpendicular to the magnetic field produced by the magnetic excitation coil, and sampling and performing signal processing after amplifying the electromotive force that is produced between the electrodes.

As illustrated in FIG. 1, the electromagnetic flow meter 1 is provided with a power supply circuit 11, a controlling circuit 12, a magnetic excitation circuit 13, a detector 14, and a setting/operation device 15, as the primary structures thereof.

The power supply circuit 11 has a function for producing various types of power supplies from an AC power supply ACIN, and supplying them to the controlling circuit 12 and the magnetic excitation circuit 13, and, as the primary circuit components thereof, is provided with a rectifying circuit 11A, a switching controlling circuit 11B, a transformer 11C, rectifying circuits 11D and 11F, and voltage regulators 11E, 11G, and 11H.

The rectifying circuit 11A rectifies the AC power supply ACIN, and outputs a DC voltage to the switching controlling circuit 11B. The switching controlling circuit 11B performs high-frequency switching of the DC voltage that is supplied from the rectifying circuit 11A, and supplies it to both of two primary-side coils of the transformer 11C. The rectifying circuit 11D rectifies the high frequencies signal that is outputted from one of the secondary side coils of the transformer 11C, to produce, and supply to the controlling circuit 12, a ground electropotential VmCOM (0 V) and an operating voltage VmA (24 V) for DC analog signal processing. The voltage regulator 11E generates the operating voltage VmD (5 V) for digital signal processing from VmA, and supplies it to the controlling circuit 12.

Additionally, the rectifying circuit 11F rectifies the high frequencies signal that is outputted from the other secondary side coils of the transformer 11C, to produce, and supply to the magnetic excitation circuit 13, DC magnetic excitation power supply voltages VexH (30 V) and VexL (15 V), and a ground electropotential VexCOM (0 V). The voltage regulator 11G generates the operating voltage VexCC (5 V) for the constant current circuit, from VexL, and supplies it to the magnetic excitation circuit 13. The voltage regulator 11H generates a common driving voltage VexG (10 V) for driving switching elements, from VexL, and supplies it to the magnetic excitation circuit 13.

The controlling circuit 12 includes a CPU, a signal processing circuit, a transmission interface circuit, and the like, and has a function for controlling the magnetic excitation circuit 13, for calculating the flow rate based on the electromotive force detected by the electrodes of the detector 14, and for outputting a flow rate signal to a higher-level device.

The magnetic excitation circuit 13 has a function for supplying a magnetic excitation current, which switches polarities with a specific period, to the magnetic excitation coil Lex of the detector 14, under the control of the controlling circuit 12. As with the conventional technology, the magnetic excitation circuit 13 has two power supplies, for high voltage and low voltage, prepared in advance, and, at this time, performs magnetic excitation with the high voltage when ramping up the magnetic excitation current, and performs magnetic excitation with the low voltage otherwise (after the magnetic excitation current has ramped up), in order to hasten the ramp-up of the magnetic excitation current when the magnetic excitation polarity has been switched.

The detector 14 has a measurement tube Pex through which the fluid for which the flow rate is to be measured flows, a magnetic excitation coil Lex for generating a magnetic field, in the measurement tube Pex, from the magnetic excitation current from the magnetic excitation circuit 13, and a pair of detection electrodes, disposed on the inner faces of the measurement tube Pex.

The setting/operating device 15 has a function for detecting, and sending to the controlling circuit 12, setting operation input from an operator, and a function for displaying, using an LED or LCD, display output from the controlling circuit 12

Figure 2:
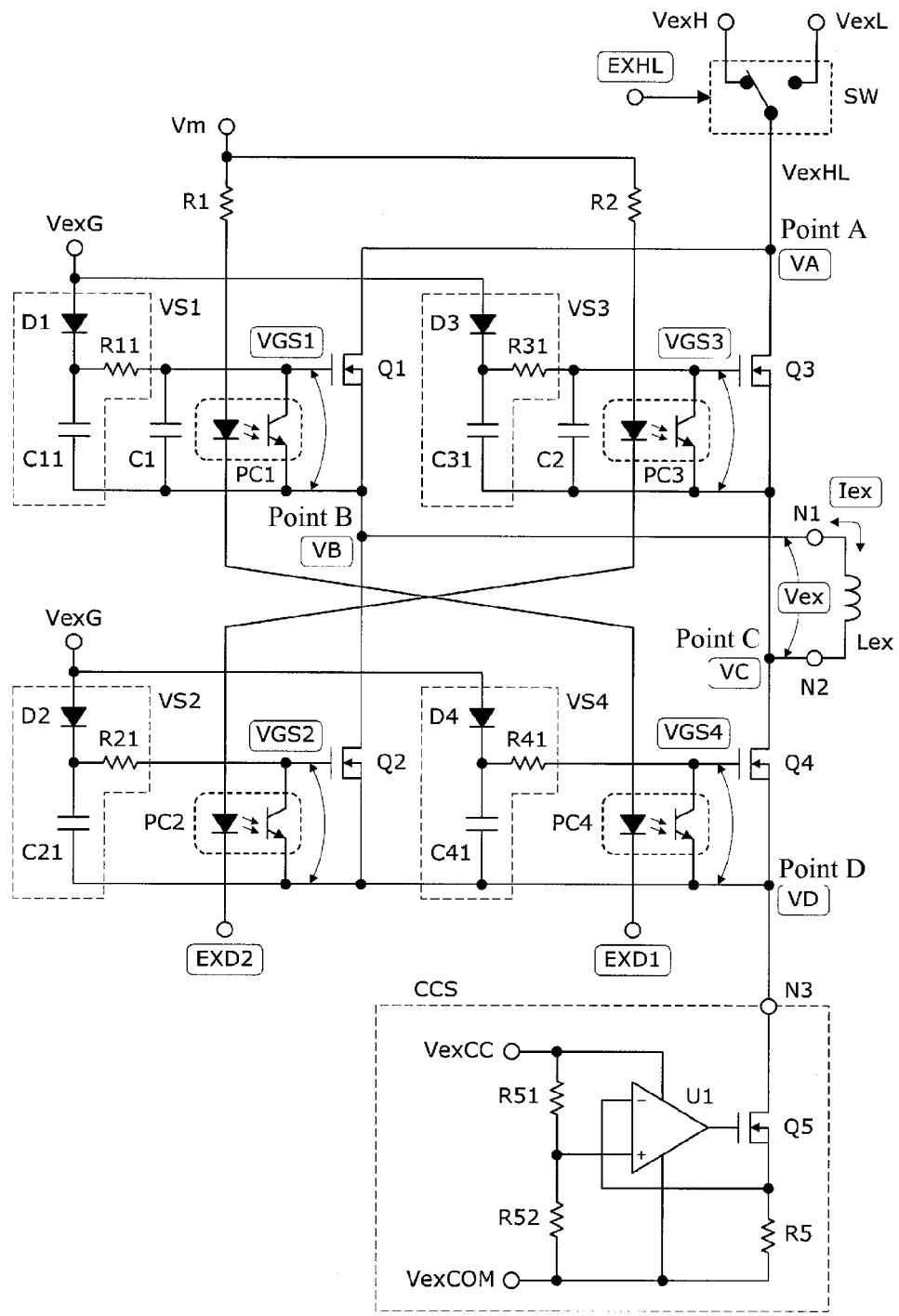
FIG. 2 is a circuit diagram illustrating a magnetic excitation circuit according to the Example.
Figure 3:
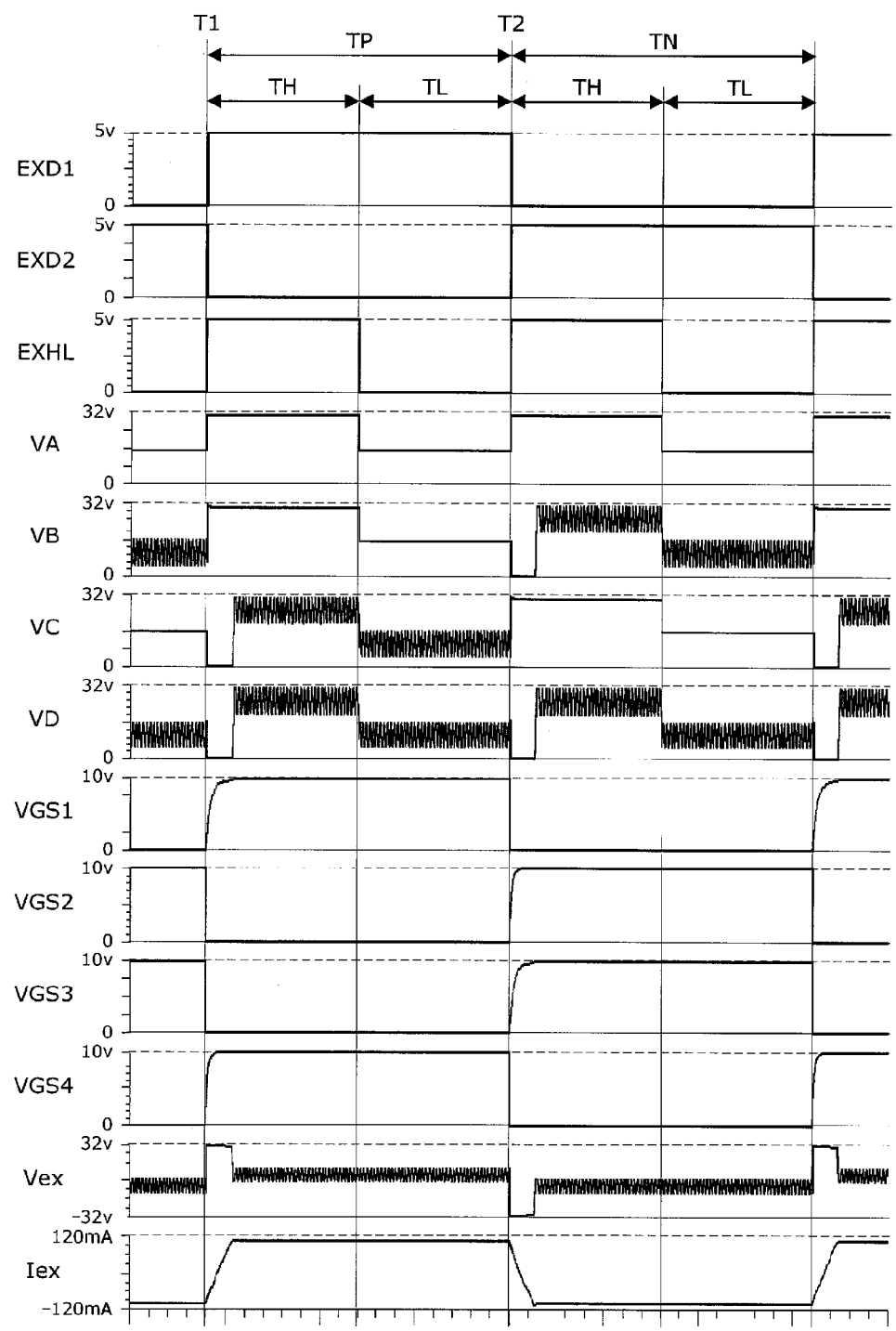
FIG. 3 is a signal waveform circuit illustrating the operation of the magnetic excitation circuit according to the Example.

The magnetic excitation circuit 13 according to the present example will be explained next, referencing FIG. 2 and FIG. 3. FIG. 2 is a circuit diagram illustrating a magnetic excitation circuit according to the Example. FIG. 3 is a signal waveform circuit illustrating the operation of the magnetic excitation circuit according to the Example.

Figure 15:
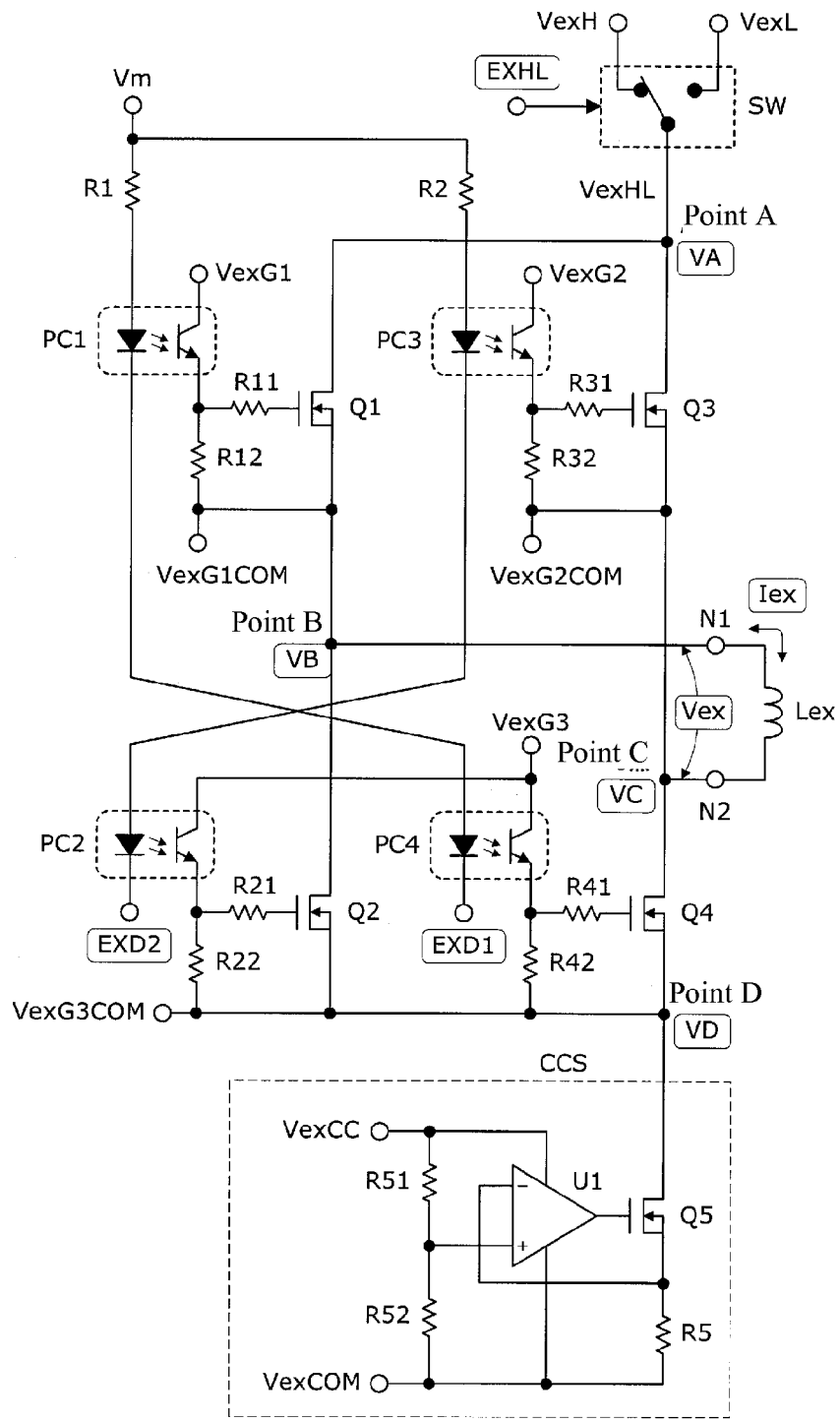
FIG. 15 is a circuit diagram illustrating a conventional magnetic excitation circuit.

The magnetic excitation circuit 13 according to the present example, when compared to the conventional excitation circuit illustrated in FIG. 15, described above, is different in the point that the insulated power supplies, that are insulated from the ground electropotential VexCOM, are completely unnecessary in the excitation circuit 13, as the operating power supply for driving the switching elements.

The magnetic excitation circuit 13 is provided with a switching element Q1 (a first switching element) and a switching element Q4 (a fourth switching element) that turn ON during the positive interval TP and turn OFF during the negative interval TN to switch the magnetic excitation current Iex to the positive polarity, and a switching element Q2 (a second switching element) and a switching element Q3 (a third switching element) that are turned ON during the negative interval TN and turned OFF during the positive interval TP to switch Iex to the negative polarity, when switching the magnetic excitation polarity between that of the positive interval TP and that of the negative interval TN with a specific with a specific period Tex (=TN+TP).

In addition, the magnetic excitation circuit 13 is provided with a switch SW for switching to output a high voltage VexH (30 V) as the magnetic excitation power supply voltage VexHL during the high-voltage interval TH beginning immediately after the magnetic excitation polarity has been switched, and for switching to output a low voltage VexL (15 V) as the magnetic excitation power supply voltage VexHL during a low-voltage interval TL, after a specific amount of time has elapsed after the magnetic excitation polarity has changed, and is also provided with a constant current circuit CCS for controlling the electric current value of the magnetic excitation current Iex to a specified value (100 mA).

Moreover, voltage storing circuits VS1 through VS4, for storing and outputting a driving voltage that is charged by a common driving voltage VexG (10 V), are connected, respectively, between the controlling terminals and output terminals of Q1 through Q4, so that when these are turned ON for the positive interval TP or the negative interval TN, the operation will be through the driving voltages that are outputted from the respective voltage storing circuits VS1 through VS4.

Note that while, in the present invention, an example wherein N-channel power MOSFETs were used for Q1 through Q4, there is no limitation thereto. For example, the power supply electropotentials may be switched and a P-channel power MOSFET may be used instead, or, instead of a power MOSFET, another switching element, such as a power transistor, may be used.

Furthermore, while, in the present invention, the explanation was for a case wherein the ratio of the high-voltage interval TH and the low-voltage interval TL was 50:50 regardless of the ramp-up of the magnetic excitation electric current Iex, there is no limitation thereto, but rather this ratio may be varied as appropriate depending on the time for ramping up the magnetic excitation current Iex.

A specific circuit configuration for the magnetic excitation circuit 13 according to the present example is as follows.

That is, in Q1, the drain terminal is connected to VexHL, the source terminal is connected to one end N1 of Lex, and between the gate terminal and the drain terminal, a voltage storing circuit (a first voltage storing circuit) VS1, for storing and outputting a driving voltage that has been charged by the common driving voltage VexG (10 V), a capacitive element for a delay (a first delay capacitive element) C1, and the output of a photocoupler (a first photocoupler) PC1 that is OFF during the positive interval TP and ON during the negative interval TN, are connected in parallel.

Moreover, the voltage storing circuit VS1 includes a diode D1, a resistive element R11, and a capacitive element C11, where the anode terminal of D1 is connected to VexG, and the cathode terminal is connected to the gate terminal of Q1 through R11, and to the source terminal of Q1 through C11.

Moreover, in Q2, the drain terminal is connected to N1 of Lex, the source terminal is connected to the input terminal N3 of the CCS, and between the gate terminal and the drain terminal, a voltage storing circuit (a second voltage storing circuit) VS2, for storing and outputting a driving voltage that has been charged by the VexG and the output of a photocoupler (a second photocoupler) PC2 that is ON during the positive interval TP and OFF during the negative interval TN, are connected in parallel.

Moreover, the voltage storing circuit VS2 includes a diode D2, a resistive element R21, and a capacitive element C21, where the anode terminal of D2 is connected to VexG, and the cathode terminal is connected to the gate terminal of Q2 through R21, and to the source terminal of Q2 through C21.

Moreover, in Q3, the drain terminal is connected to VexHL, the source terminal is connected to the other end N2 of Lex, and between the gate terminal and the drain terminal, a voltage storing circuit (a third voltage storing circuit) VS3, for storing and outputting a driving voltage that has been charged by the VexG, a capacitive element for a delay (a second delay capacitive element) C2, and the output of a photocoupler (a third photocoupler) PC3 that is OFF during the positive interval TP and ON during the negative interval TN, are connected in parallel.

Moreover, the voltage storing circuit VS3 includes a diode D3, a resistive element R31, and a capacitive element C31, where the anode terminal of D3 is connected to VexG, and the cathode terminal is connected to the gate terminal of Q3 through R31, and to the source terminal of Q3 through C31.

Moreover, in Q4, the drain terminal is connected to N2 of the magnetic excitation coil Lex, the source terminal is connected to N3 of the CCS, and between the gate terminal and the drain terminal, a voltage storing circuit (a fourth voltage storing circuit) VS4, for storing and outputting a driving voltage that has been charged by the VexG and the output of a photocoupler (a fourth photocoupler) PC4 that is ON during the positive interval TP and OFF during the negative interval TN, are connected in parallel.

Moreover, the voltage storing circuit VS4 includes a diode D4, a resistive element R41, and a capacitive element C41, where the anode terminal of D4 is connected to VexG, and the cathode terminal is connected to the gate terminal of Q4 through R41, and to the source terminal of Q4 through C41.

Note that in PC1, the control side diode is connected, with the anode terminal connected to the operating voltage Vm from the controlling circuit 12 through the resistive element R1, and the cathode terminal is connected to the anode terminal of the control side diode of PC4. Moreover, in PC3, the control side diode is connected, with the anode terminal connected Vm from the controlling circuit 12 through the resistive element R2, and the cathode terminal is connected to the anode terminal of the control side diode of PC2. Additionally, for the control side diode of the PC4, the cathode terminal is connected to a polarity switching signal (a first polarity switching signal) EXD1 from the CPU, and for the control side diode of the PC2, the cathode terminal is connected to a polarity switching signal (a second polarity switching signal) EXD2 from the CPU.

Moreover, U1 of the constant current circuit CCS is an operational amplifier that is operated by the operating voltage VexCC and the ground electropotential VexCOM, where the non-inverting input terminal is connected to an electropotential wherein the voltage difference between VexCC and VexCOM is divided by resistive elements R51 and 52, for setting the magnetic excitation current. Moreover, the output terminal of U1 is connected to the gate terminal of an active element Q5 (a power MOSFET), where the drain terminal of Q5 is connected to N3 of the CCS, and the source terminal of Q5 is connected to the non-inverting input terminal of U1 and also through a resistive element R5, for detecting the magnetic excitation current, to VexCOM. Furthermore, when the CCS performs control of the magnetic excitation current Iex to a constant value, Q5 acts so as to dissipate the excess electric energy other than the energy that is supplied to the magnetic excitation coil Lex (Vex×Iex), and thus Q5 is given a heat dissipating function through, for example, a heat sink.

Operation of the Example

The operation of the present example will be explained next, referencing FIG. 3. Note that FIG. 3 VA through VD are the electropotentials of point A through point D in FIG. 2, referenced to the ground electropotential VexCOM (0 V).

Figure 16:
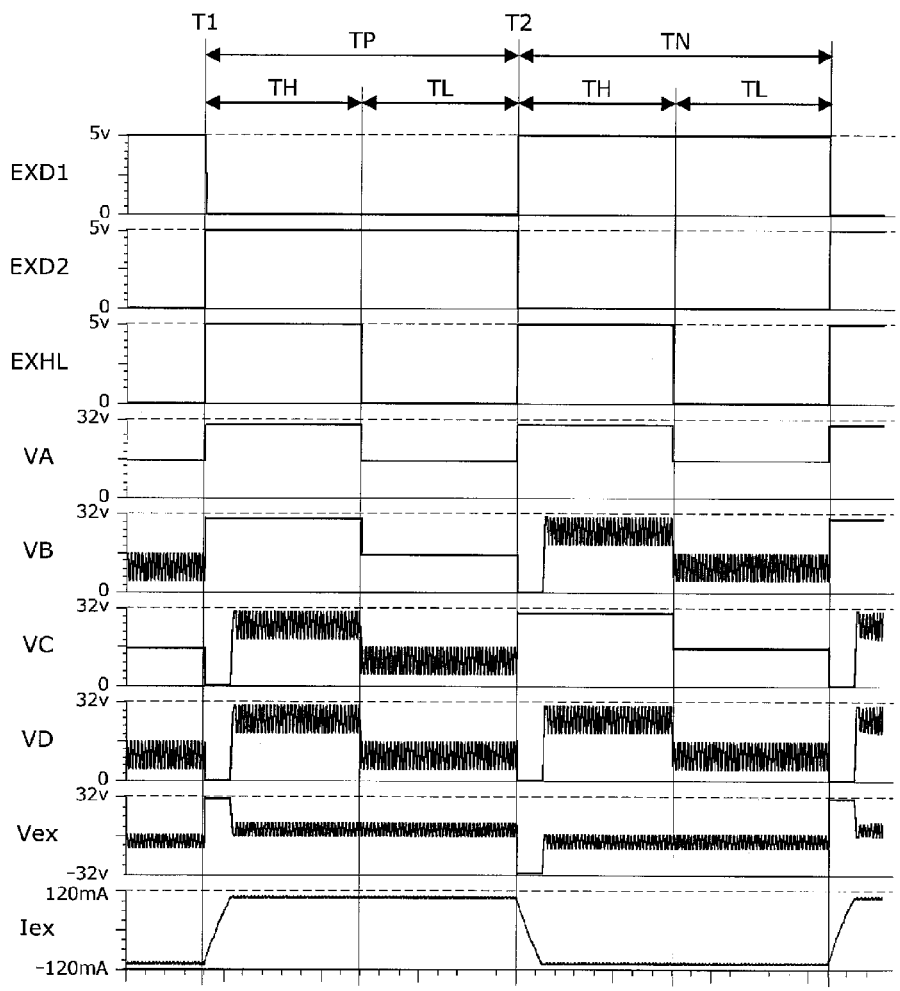
FIG. 16 is a signal waveform diagram illustrating the operation of the conventional magnetic excitation circuit.

At the starting time T1 for the positive interval TP, the polarity switching signal EXD1 is switched to the high level, and the polarity switching signal EXD2 is switched to the low level, and thus the photocouplers PC1 and PC4 are turned OFF and PC2 and PC3 are turned ON. Note that in the present invention, EXD1 and EXD2 have the opposite logic of that in FIG. 16 for the conventional technology. In FIG. 3, Vex is an excitation voltage that is applied between N1 and N2.

During the positive interval TP, immediately after switching the magnetic excitation polarity is the high-voltage interval TH, where the high voltage VexH is outputted, as the magnetic excitation power supply voltage VexHL, from the switch SW, but due to the inductance of the magnetic excitation coil Lex, the magnetic excitation current Iex does not rise immediately.

In response to this, the operational amplifier U1 of the constant current circuit CCS outputs the maximum voltage (approximately 5 V, which is approximately VexCC), so Q5 goes into the fully ON state (where the drain-source resistance RDS is approximately 0Ω).

Because of this, the electropotential at the input terminal N3 of the CCS, that is, the electropotential at point D, goes to about 0 V, and C41 is charged by the common driving voltage VexG through the diode D4, to store the driving voltage (approximately 10 V). This driving voltage that is stored in C4 is applied through a resistive element R41, to between the gate and the source of Q4, to turn Q4 ON.

Moreover, when Q4 is ON, then the electropotential at point C goes to about 0 V, so C31 is charged by the common driving voltage VexG through the diode D3, to store the driving voltage (approximately 10 V), but at the starting time T1, the photocoupler PC3 is ON, so Q3 continues in the OFF state.

Consequently, at the starting time T1, C11 already has the driving voltage stored, having been charged in advance by the common driving voltage VexG during the previous negative interval TN wherein Q1 was OFF, so, in response to the photocoupler PC1 turning OFF, the driving voltage C11 is applied through R11 to between the gate and the source of Q1, turning Q1 ON. However, the timing with which Q1 turns ON is slightly delayed from the timing with which Q4 is turned ON, by the amount it takes for the effect of C1.

At this time, when Q1 turns ON, the electropotential at point B rises to about 30 V; however, because of D1, the voltage of C1 does not flow backwards to the VexG side, but rather the gate-source voltage VGS1 of Q1 maintains its approximately 10 V.

In this way, Q1 and Q4 being ON during the positive interval TP causes approximately 30 V to be applied between the terminals N1 and N2 of Lex, causing a magnetic excitation current Iex of a positive polarity to flow from N1 to N2.

Thereafter, once the setting value for the magnetic excitation current Iex (for example, 100 mA) has been reached, then the magnetic excitation current control is applied by the constant current circuit CCS, so although the electropotential at point D has risen to 15 V or more, the presence of the diode D4 prevents the voltage of C4 from flowing back to the VexG side, so that the gate-source voltage VGS4 of Q4 remains at about 10 V.

After this, after the completion of the high-voltage interval TH of the positive interval TP has elapsed, then the voltage switching signal EXD1 goes to the low level, to produce the low-voltage interval TL, where the magnetic excitation power supply voltage VexHL is switched to the low voltage VexL by the switch SW, so the source electropotential of Q1 and Q4 also fall, so as to have no effect on the gate-source voltages VGS1 and VGS4, thereof.

Moreover, by switching the excitation power supply voltage VexHL to the low voltage VexL, this reduces the power consumption of the constant current circuit CCS, and suppresses heating of Q5.

Thereafter, once the timing for switching the magnetic excitation polarity has been reached, by arriving at the starting time T2 for the negative interval TN, the polarity switching signal EXD1 goes to the low level and the polarity switching signal EXD2 goes to the high level, so the photocouplers PC1 and PC4 turn ON and PC2 and PC3 turn OFF, and Q1 and Q4 turn OFF.

Thereafter, the operations described above for Q1 and Q4 are replaced by the operations of Q2 and Q3, where approximately −30 V is applied between the terminals N1 and N2 of the magnetic excitation coil Lex, and a magnetic excitation current Iex of a negative polarity flows from N2 to N1.

After this, after the completion of the high-voltage interval TH of the negative interval TN has elapsed, then the voltage switching signal EXD1 goes to the low level, to produce the low-voltage interval TL, where the magnetic excitation power supply voltage VexHL is switched to the low voltage VexL by the switch SW, so the source electropotential of Q2 and Q3 also fall, so as to have no effect on the gate-source voltages VGS2 and VGS3, thereof.

Thereafter, the operations, described above, for the positive interval TP and the operations for the negative interval TN are repeated alternatingly.

In this way, in the present example is a magnetic excitation circuit wherein, with each positive interval TP/negative interval TN, which are repeated at set intervals, the magnetic excitation current Iex switches to the positive polarity/negative polarity, and additionally, at the beginning times for these positive interval TP and negative interval TN, the magnetic excitation power supply voltage VexHL during the high-voltage interval TH is switched to the high voltage, and then after a specific amount of time has elapsed after the starting time, the magnetic excitation power supply voltage VexHL is switched to the low voltage during the low-voltage interval TL, provided with switching elements Q1 and Q4 (power MOSFETs) that are provide the magnetic excitation current Iex during the positive interval TP and are OFF during the negative interval TN, to provide a magnetic excitation current Iex of a positive polarity to the magnetic excitation coil Lex, switching elements Q2 and Q3 (power MOSFETs) that are OFF during the positive interval TP and that supply the negative polarity magnetic excitation current Iex to the magnetic excitation coil Lex during the negative interval TN, and a constant current circuit CCS for controlling, to a specific value, the magnetic excitation current Iex.

Moreover, voltage storing circuits VS1 through VS4, for storing and outputting a driving voltage that is charged by a common driving voltage VexG (10 V), are connected, respectively, between the controlling terminals and output terminals of Q1 through Q4, so that when these are turned ON for the positive interval TP or the negative interval TN, the operation will be through the driving voltages that are outputted from the respective voltage storing circuits VS1 through VS4.

More specifically, in Q1, the drain terminal is connected to VexHL, the source terminal is connected to one end N1 of Lex, and between the gate terminal and the drain terminal, a voltage storing circuit VS1, for storing and outputting a driving voltage that has been charged by the common driving voltage VexG, and the output of a photocoupler PC1 that is OFF during the positive interval TP and ON during the negative interval TN, are connected in parallel, and, in Q2, the drain terminal is connected to N1, the source terminal is connected to the input terminal N3 of the CCS, and between the gate terminal and the drain terminal, a voltage storing circuit VS2, for storing and outputting a driving voltage that has been charged by the VexG and the output of a photocoupler PC2 that is ON during the positive interval TP and OFF during the negative interval TN, are connected in parallel.

Additionally, in Q3, the drain terminal is connected to VexHL, the source terminal is connected to the other end N2 of Lex, and between the gate terminal and the drain terminal, a voltage storing circuit VS3, for storing and outputting a driving voltage that has been charged by VexG, and the output of a photocoupler PC3 that is ON during the positive interval TP and OFF during the negative interval TN, are connected in parallel, and, in Q4, the drain terminal is connected to N2, the source terminal is connected to N3, and between the gate terminal and the drain terminal, a voltage storing circuit VS4, for storing and outputting a driving voltage that has been charged by the VexG and the output of a photocoupler PC4 that is OFF during the positive interval TP and ON during the negative interval TN, are connected in parallel.

As a result, when, at the beginning of the positive interval TP, PC1 and PC4 are turned ON, the driving voltage that has been stored already by the common driving voltage VexG during the negative interval TN is supplied from VS1 to the gate terminal of Q1, and the driving voltage that has been stored by the common driving voltage VexG during the negative interval TN is supplied from VS4 to the gate terminal of Q4.

Moreover, when, at the beginning of the negative interval TN, PC2 and PC3 are turned ON, the driving voltage that has been stored already by the common driving voltage VexG during the positive interval TP is supplied from VS2 to the gate terminal of Q2, and the driving voltage that has been stored by the common driving voltage VexG during the positive interval TP is supplied from VS3 to the gate terminal of Q3.

This makes it possible to drive Q1 through Q4 through driving voltages that have been stored in VS1 through VS4, which are provided for Q1 through Q4, when switching of the positive interval or negative interval, without requiring separate insulated power supplies as driving power supplies for driving Q1 through Q4. Because of this, in the power supply circuit 11, it is possible to avoid an increase in cost in the power supply circuit 11 because it there is no need to increase the number of secondary side coils in the transformer 11C or the number of secondary side current rectifiers to produce a plurality of insulated power supplies to supply the magnetic excitation circuit 13.

Moreover, a delaying capacitive element C1, for delaying Q1 turning ON, may be provided between the gate terminal and the source terminal of Q1 in the present example, and a delaying capacitive element C2, for delaying Q3 turning ON, may be connected between the gate terminal and the source terminal of the switching element Q3.

Figure 4:
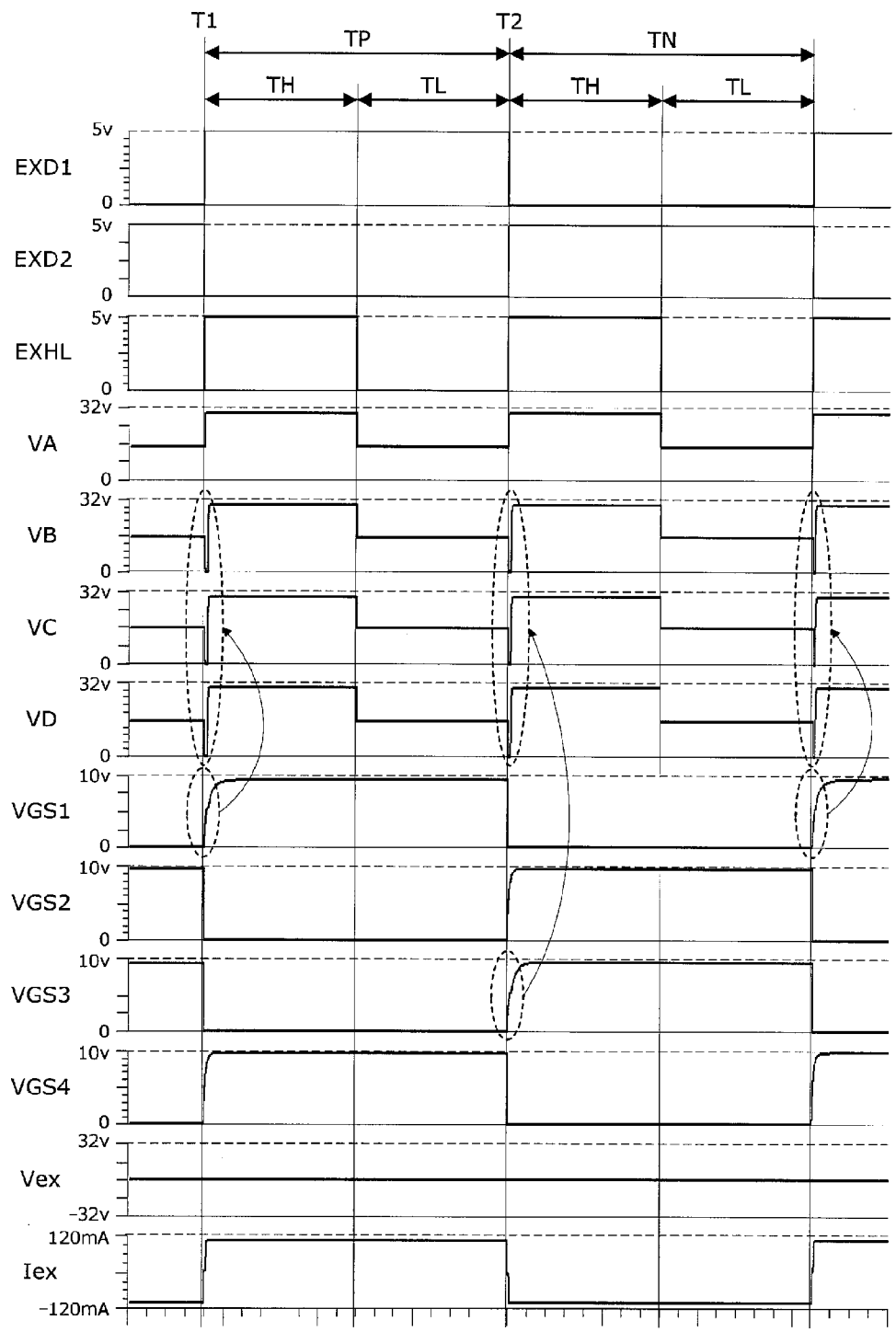
FIG. 4 is a signal waveform diagram illustrating another operation of the magnetic excitation circuit according to the Example (when there is a short circuit fault).

FIG. 4 is a signal waveform diagram illustrating another operation of the magnetic excitation circuit according to the Example (when there is a short circuit fault).

When the magnetic excitation coil Lex is operating properly, the increase in Iex is delayed by the inductance thereof, so there will always be a time interval before the electropotential VD of point D goes to essentially 0 V when the magnetic excitation polarity has been switched, and thus C11 through C14 will be charged reliably.

However, if a short occurs in Lex, then the inductance will go to zero, and the magnetic excitation current Iex will rise instantly, preventing full charging of C11 through C14, so that the gate-source voltages of Q1 through Q4 will be inadequate, making it possible for them to go to the fully-ON state (wherein the drain-source resistance RDS would be essentially 0Ω).

Here when the drain-source resistances RDS in Q1 through Q4 are large then RDS×Iex power will be consumed, producing excessive heating. In particular, because the heat dissipating function through a heat sink, such as in Q5 of the constant current circuit CCS, is not provided in Q1 through Q4, if this state were to continue then, in the worst case, there would be the possibility of a fire.

Consequently, delaying capacitive elements C1 and C2 may be provided between the gates and sources in Q1 and Q3, to provide an ON delay interval, to produce a magnetic excitation current stop interval TS wherein Iex reliably goes to zero. This TS causes U1 of the CCS to output the maximum voltage (about 5 V), causing Q5 to go into a fully ON state (with the drain-source resistance RDS essentially zero), so that the electropotential at point D goes to about 0 V, so that, by the same principle as described above, the charging of C1 through C4 will be performed reliably. Doing so makes it possible to prevent malfunction even in the unlikely event of a short in the Lex.

Moreover, preferably the ON delay time in Q1 and Q3 is sufficiently longer than the control response time of CCS (which, in the explanation above, is the time required for U1 to output the maximum voltage and for Q5 to turn completely ON), and sufficiently shorter than the time for the magnetic excitation current to ramp up (when Lex is operating correctly). This makes it possible to prevent malfunction by charging C1 through C4 reliably, even when there is a short in Lex, without delaying the magnetic induction current from ramping up when Lex is operating properly.

Another Example

Figure 5:
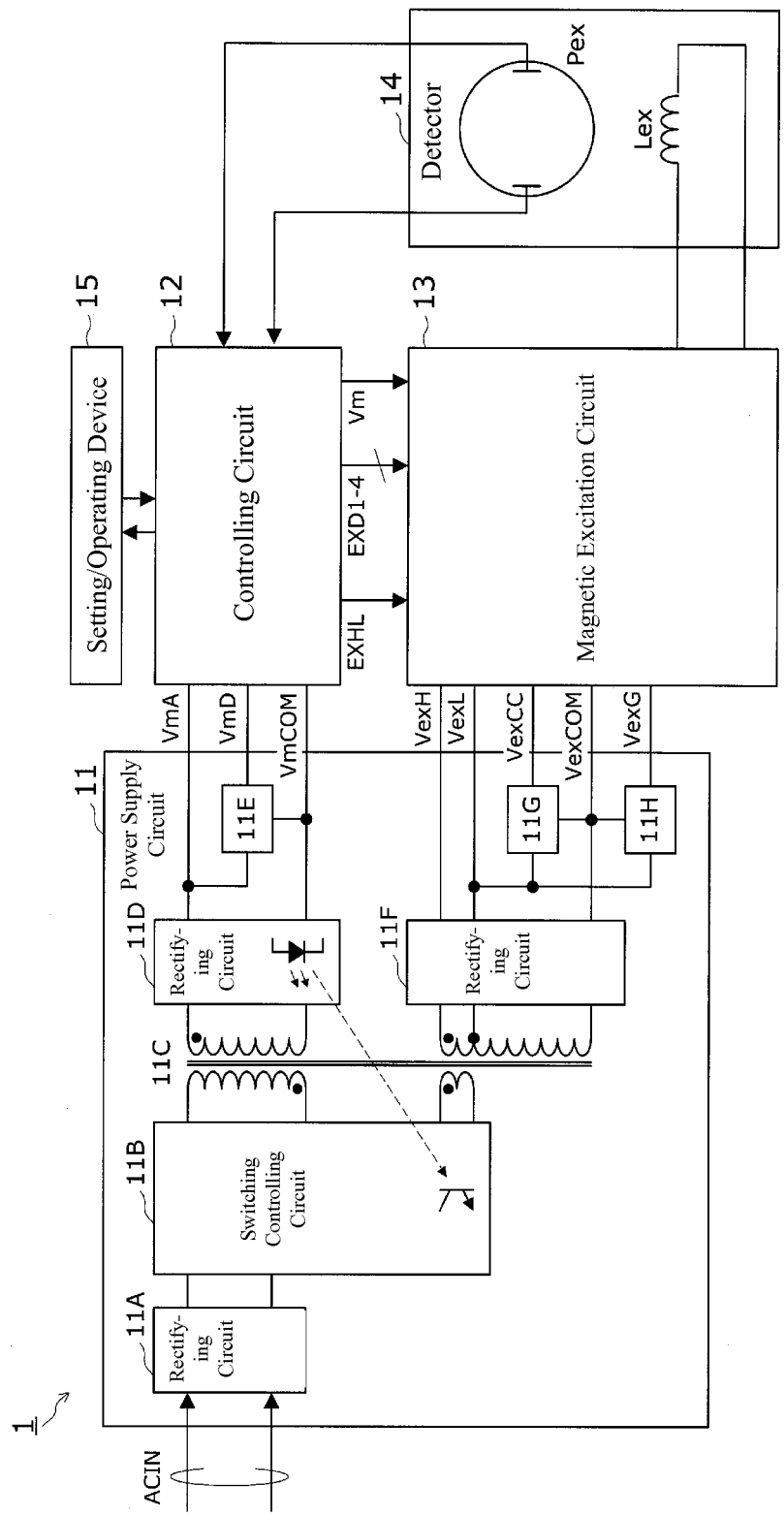
FIG. 5 is a block diagram illustrating the structure of an electromagnetic flow meter according to Another Example.
Figure 6:
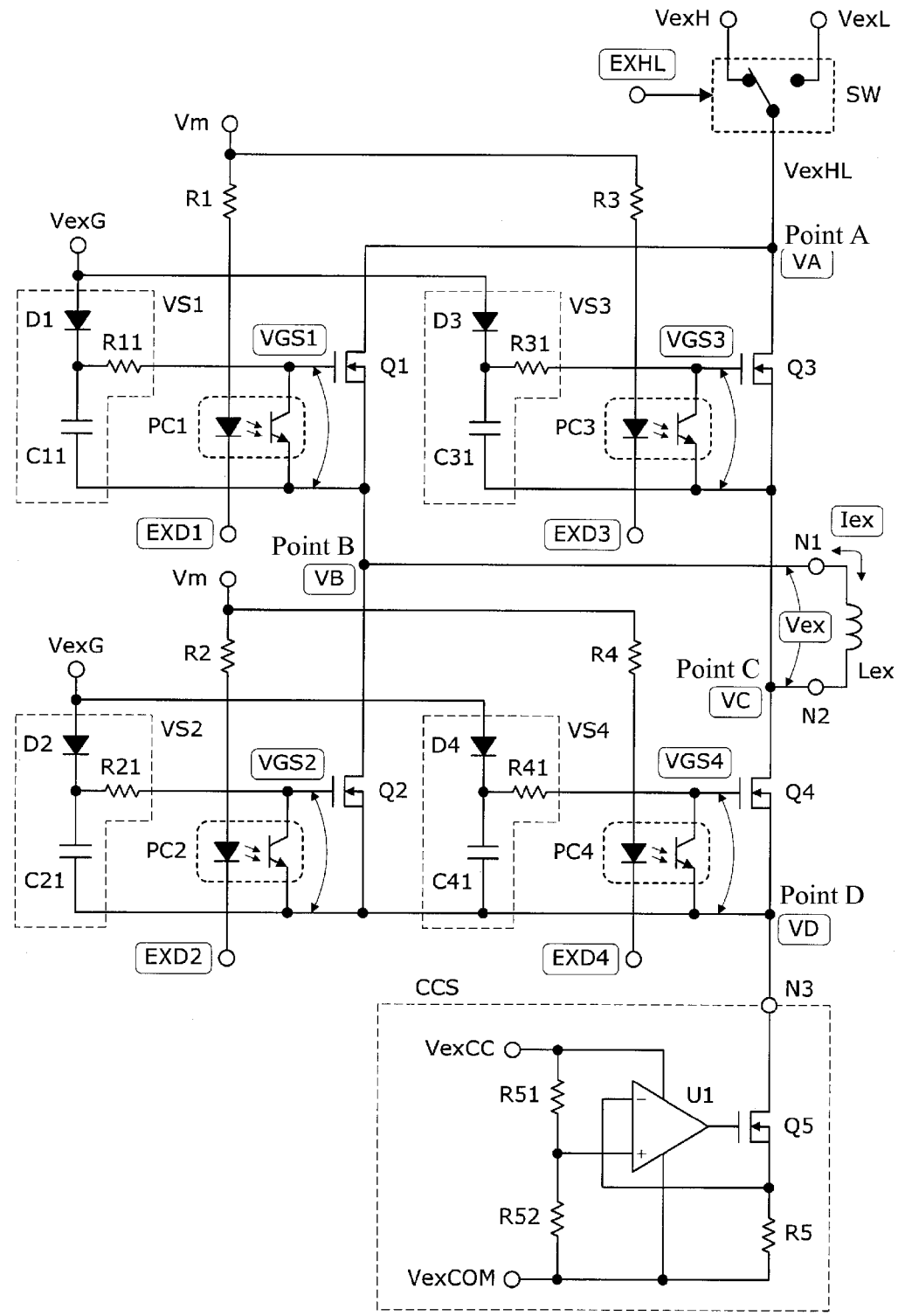
FIG. 6 is a circuit diagram illustrating a magnetic excitation circuit according to the Another Example.
Figure 7:
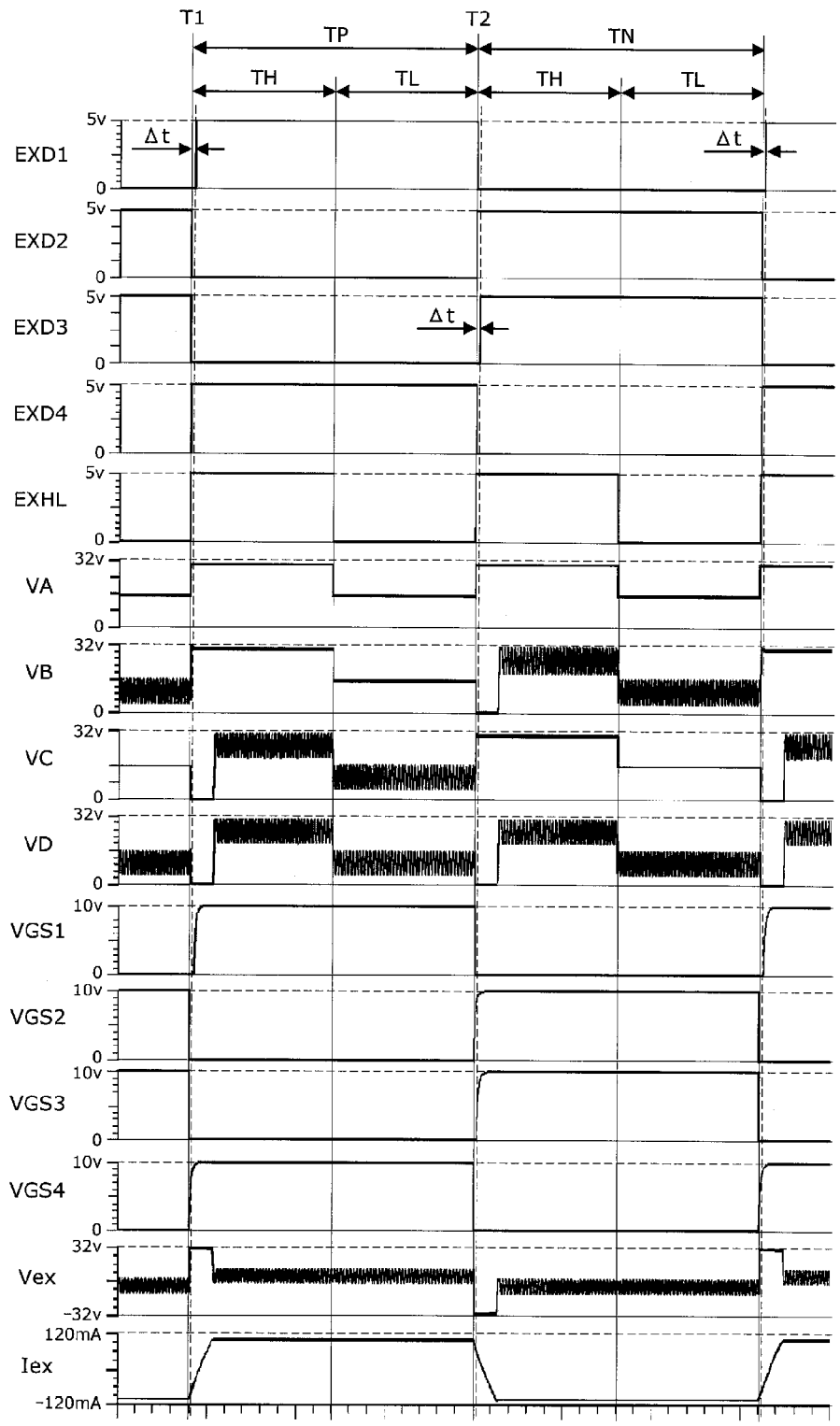
FIG. 7 is a signal waveform circuit illustrating the operation of the magnetic excitation circuit according to the Another Example.

Next an electromagnetic flow meter 1 according to Another Example according to the present invention will be explained in reference to FIG. 5 through FIG. 7. FIG. 5 is a block diagram illustrating a structure of an electromagnetic flow meter according to a second example. FIG. 6 is a circuit diagram illustrating a magnetic excitation circuit according to the Another Example. FIG. 7 is a signal waveform circuit illustrating the operation of the magnetic excitation circuit according to the Another Example.

In the Example, a case was presented wherein the ON delay of the switching elements Q1 and Q3 was achieved by the delaying capacitive elements C1 and C2. In the present example a case will be explained wherein polarity switching signals EXD3 and EXD4, from the CPU, are provided in addition to the polarity switching signals EXD1 and EXD2, to control each of the switching elements Q1 through Q4 independently, where, of these, the ON delays in Q1 and Q3 are controlled by the CPU through controlling the switching timing of the polarity switching signals EXD1 and EXD3 for these Q1 and Q3.

As illustrated in FIG. 6, in the magnetic excitation circuit 13 according to the present example, the photocouplers PC 1 through PC4 are switched ON/OFF by the polarity switching signals EXD1 through EXD4, which are provided respectively, to switch them ON and OFF, respectively, synchronized to the positive interval TP and the negative interval TN.

At this time, EXD1 is outputted from the CPU so as to switch to the high level with a delay of a specific delay time Δt at the time of the start of the positive interval TP, and EXD3 is outputted from the CPU so as to switch to the high level with a delay of a specific delay time Δt at the time of the start of the negative interval TN.

Consequently, PC1 is turned OFF with a delay of the specific delay time Δt at the start time of the positive interval TP by EXD1, and, in response, Q1 also is turned ON with a delay of the specific delay time Δt at the start time for the positive interval TP.

Moreover, PC3 is turned OFF with a delay of the specific delay time Δt at the start time of the negative interval TN by EXD3, and, in response, Q3 also is turned ON with a delay of the specific delay time Δt at the start time for the negative interval TN.

In this way, in the present example the photocouplers PC1 through PC4 are each switched ON/OFF respectively, with the positive interval TP or negative interval TN, by the polarity switching signals EXD1 through EXD4 that are provided individually and, of these, PC1 is turned OFF (Q1 is turned ON) with a delay of a specific delay time Δt at the time of the start of the positive interval TP by EXD1, and PC3 is turned OFF (Q3 is turned ON) with a delay of a specific delay time Δt at the time of the start of the negative interval TN by EXD3.

As a result, at the time of switching the polarity of the magnetic excitation current Iex, a magnetic excitation current stop interval TS can be produced where Iex reliably goes to zero. This TS causes the operational amplifier U1 of the constant current circuit CCS to output the maximum voltage (about 5 V), to cause Q5 to go into the fully ON state (where the drain-source resistance RDS is approximately 0Ω), causing the electropotential at point D to go to approximately 0 V, and thus, by the same principle as described above, causes the capacitive elements C1 through C4 to be charged reliably. Doing so makes it possible to prevent malfunction even in the unlikely event of a short in the magnetic excitation coil Lex.

Yet Another Example

Figure 8:
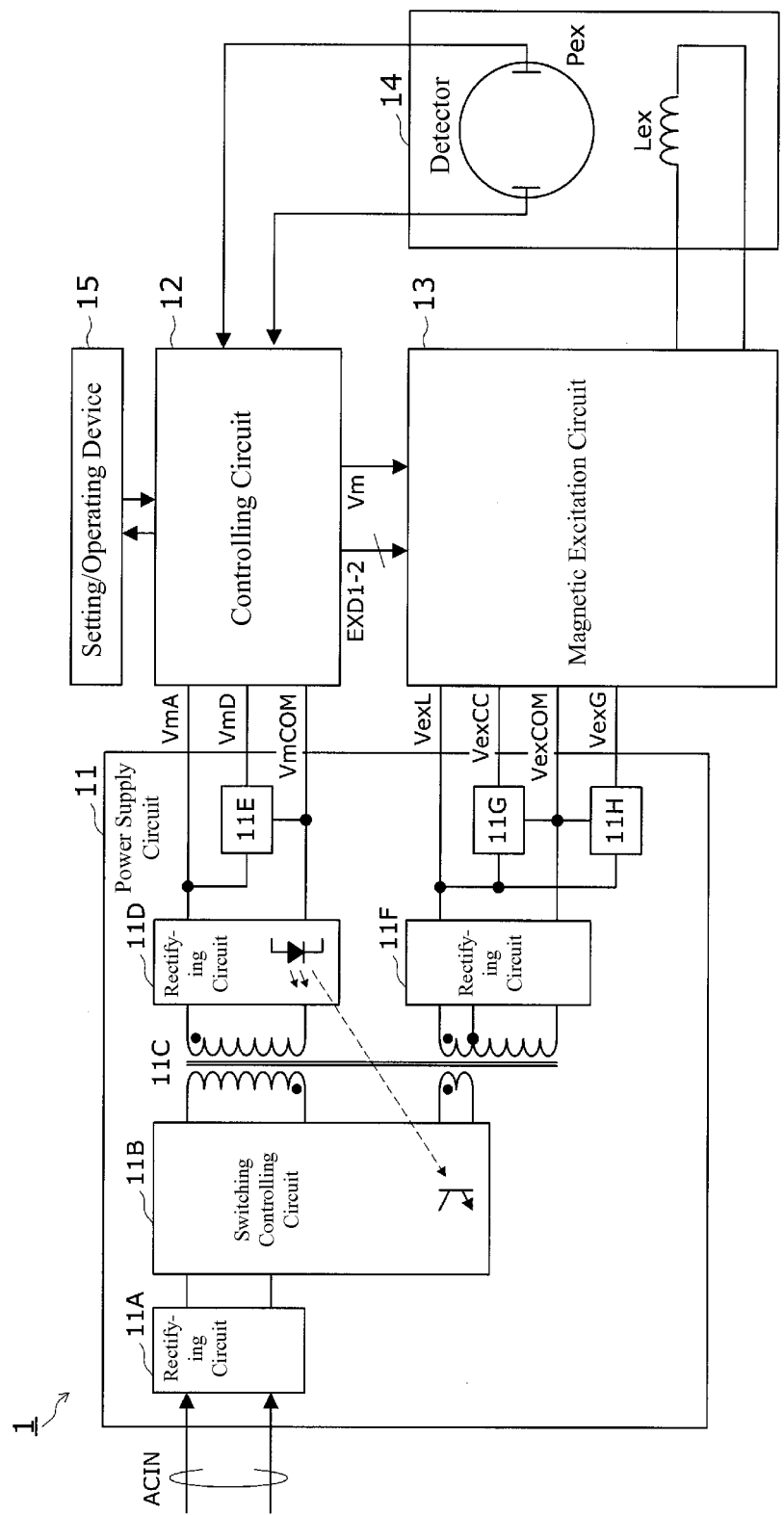
FIG. 8 is a block diagram illustrating the structure of an electromagnetic flow meter according to Yet Another Example.
Figure 9:
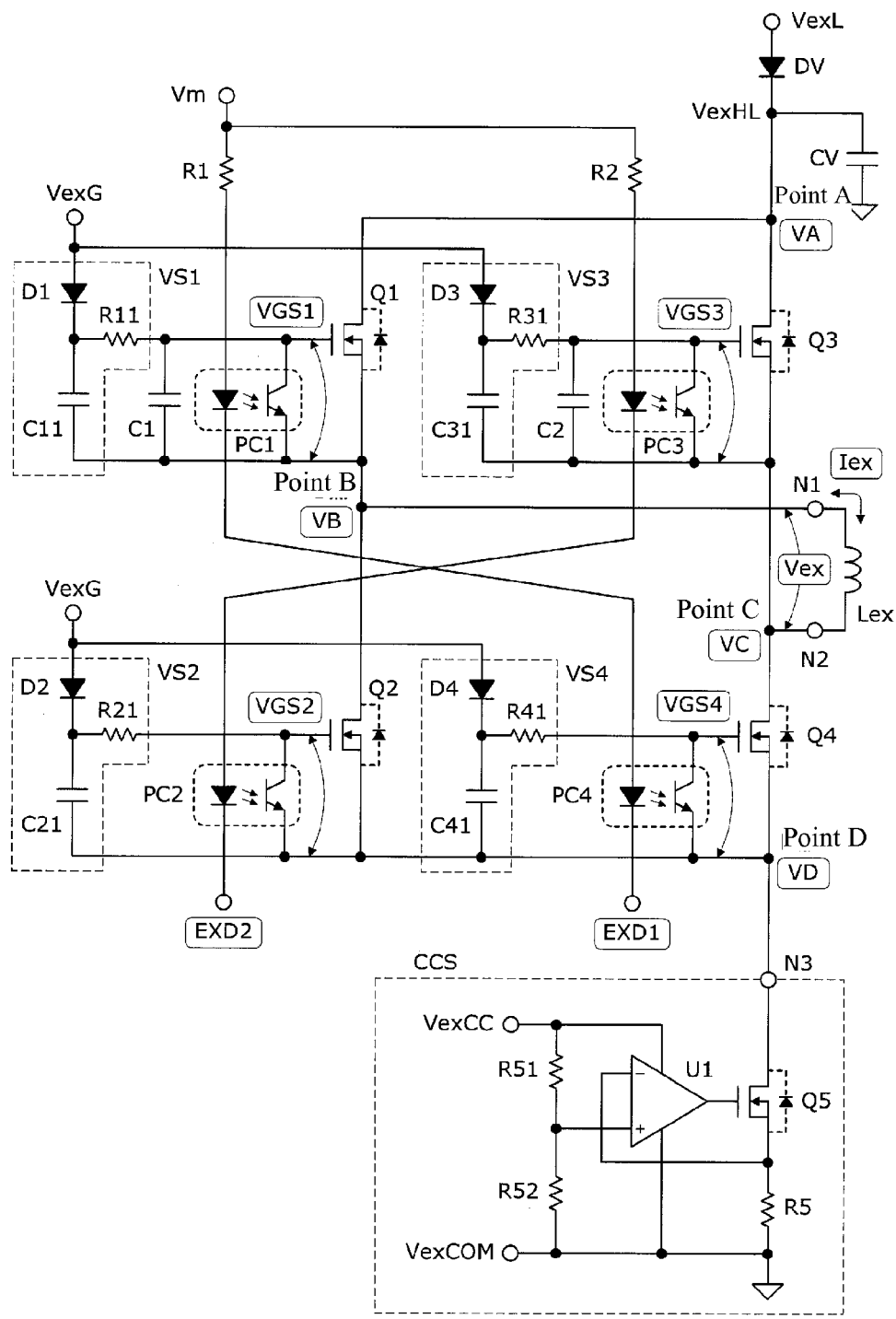
FIG. 9 is a circuit diagram illustrating a magnetic excitation circuit according to the Yet Another Example.
Figure 10:
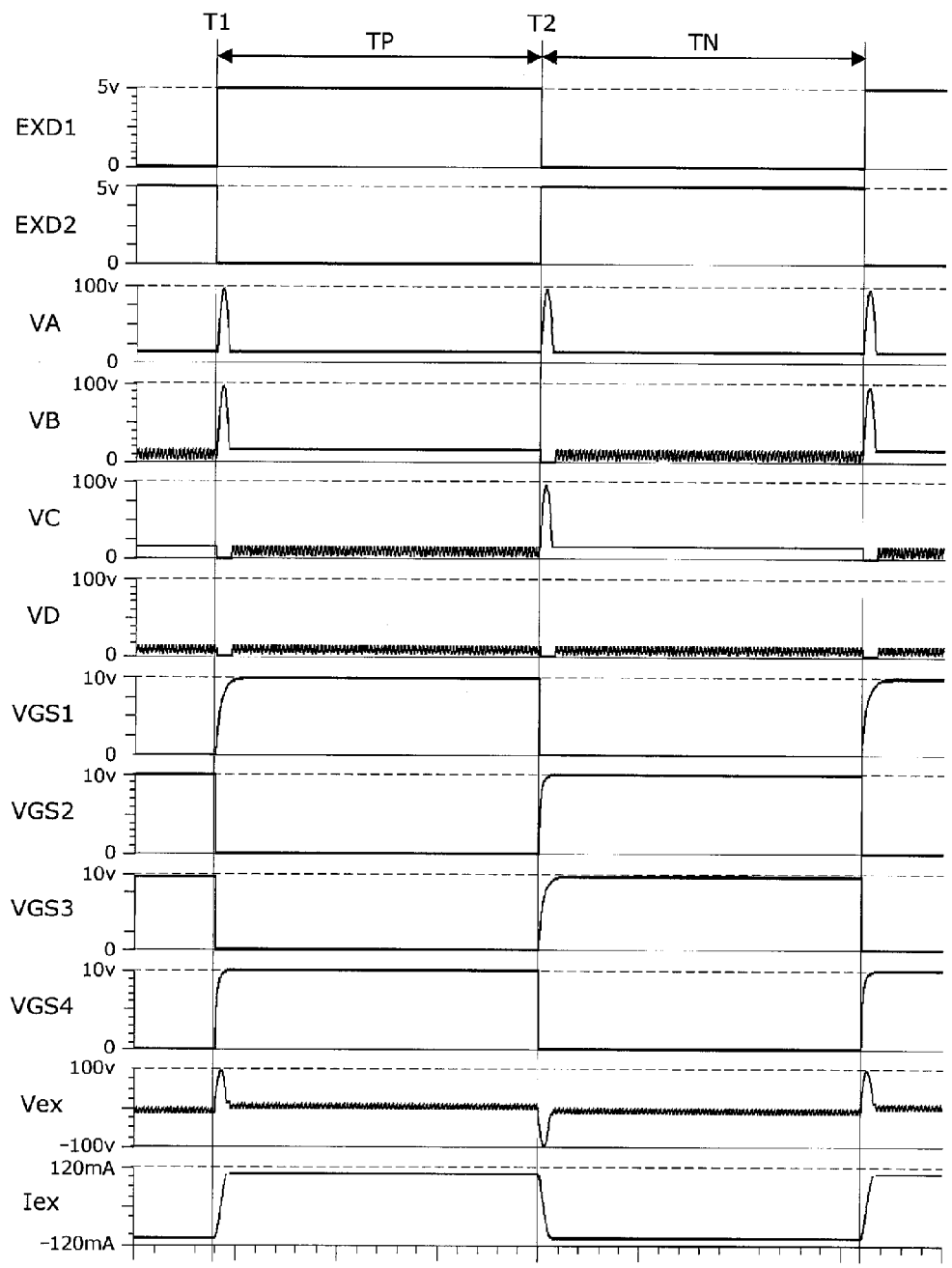
FIG. 10 is a signal waveform circuit illustrating the operation of the magnetic excitation circuit according to the Yet Another Example.

Next an electromagnetic flow meter 1 according to Yet Another Example according to the present invention will be explained in reference to FIG. 8 through FIG. 10. FIG. 8 is a block diagram illustrating a structure of an electromagnetic flow meter according to a the Yet Another Example. FIG. 9 is a circuit diagram illustrating a magnetic excitation circuit according to the Yet Another Example. FIG. 10 is a signal waveform circuit illustrating the operation of the magnetic excitation circuit according to the Yet Another Example.

In the Example and Another Example, the explanations used, as examples, cases wherein a high voltage VexH (30 V) and a low voltage VexL (15 V) were generated by the power supply circuit 11 and supplied to the magnetic excitation circuit 13 as the magnetic excitation power supply voltage VexHL, and in the magnetic excitation power circuit 13, this was controlled by switching, through a switch SW, based on a voltage switching was signal EXD1 from the CPU.

In the present example, the explanation will be for a case wherein only VexL will be used as VexHL, without switching the magnetic excitation power supply voltage VexHL, where the reverse electromotive force that is generated in the magnetic excitation coil Lex is used to generate the high voltage VexH.

As illustrated in FIG. 9, instead of the switch SW, a charging capacitive element CV and a reverse flow preventing diode DV are provided in the magnetic excitation circuit 13 in the present example.

One end of the CV is connected in common to the drain terminals of the switching elements Q1 and Q3, and the other end is connected to the ground electropotential VexCOM (0 V).

The anode terminal of the DV is connected to VexL, and the cathode terminal is connected to the one end of the CV, that is, is connected in common to the drain terminals of Q1 and Q3.

Normally, a strong reverse electromotive force is generated in the Lex at the time of switching the polarity of Iex. Moreover, when power MOSFETs are used as Q1 through Q5, the reverse electromotive force produced between N1 and N2 (where VB>VC) is absorbed through flowing back to the VexHL side through R5 and the parasitic diodes that exist between the drains and the sources in Q1 through Q5.

On the other hand, because, in the present example, the reverse flow to the VexL side is prevented by the reverse flow preventing diode DV, the reverse electromotive force (VB>VC) that is produced between N1 and N2 when switching from the negative interval TN to the positive interval TP charges the charging capacitive element CV through R5 and the parasitic diodes that exist between the drains and the sources of Q1, Q4, and Q5. Moreover, the reverse electromotive force (VB<VC) that is produced between N1 and N2 when switching from the positive interval TP to the negative interval TN charges CV through R5 and the parasitic diodes that exist between the drains and sources of Q2, Q3, and Q5.

Consequently, starting immediately after switching the polarity of Iex, a charging voltage VexC for the CV, rather than the high voltage, is supplied to the drain terminals of Q1 and Q3 as VexHL. Thereafter, in response to the drop in VexC, VexL is provided to the drain terminals of Q1 and Q3, as VexHL, through the diode DV.

Note that although the electropotentials VA, VB, and VC at point A, point B, and point C rise tremendously, to about 100 V, due to the reverse electromotive force, there is absolutely no effect on the voltages between the gates and sources in Q1 through Q4.

As described above, in the present example the charging capacitive element CV that is connected in common to the input terminals of both Q1 and Q3 is charged through the reverse electromotive force that is produced in the Lex when switching the polarity of Iex, where the charging voltage VexC that is produced is supplied to the drain terminals of these Q1 and Q3 as the high voltage, and the reverse flow preventing diode DV that has the anode terminal thereof connected to the low voltage VexL and the cathode terminal thereof connected in common to the drain terminals of Q1 and Q3 not only prevents the reverse flow from the reverse electromotive force relative to VexL, but also provides, to the drain terminals of Q1 and Q3 a VexL in response to a drop in VexC.

As a result, the VexC that has been charged into CV is reused as VexHL, thus making it possible to avoid the production of a lag in the rise of Iex, by supplying only VexL from the power supply circuit 11 to the magnetic excitation circuit 13 as the magnetic excitation power supply voltage VexHL. Moreover, having the CV have the appropriate capacitance value makes it possible to cause the ramp-up of Iex to be faster than in the Example and Another Example.

Further Example

Figure 11:
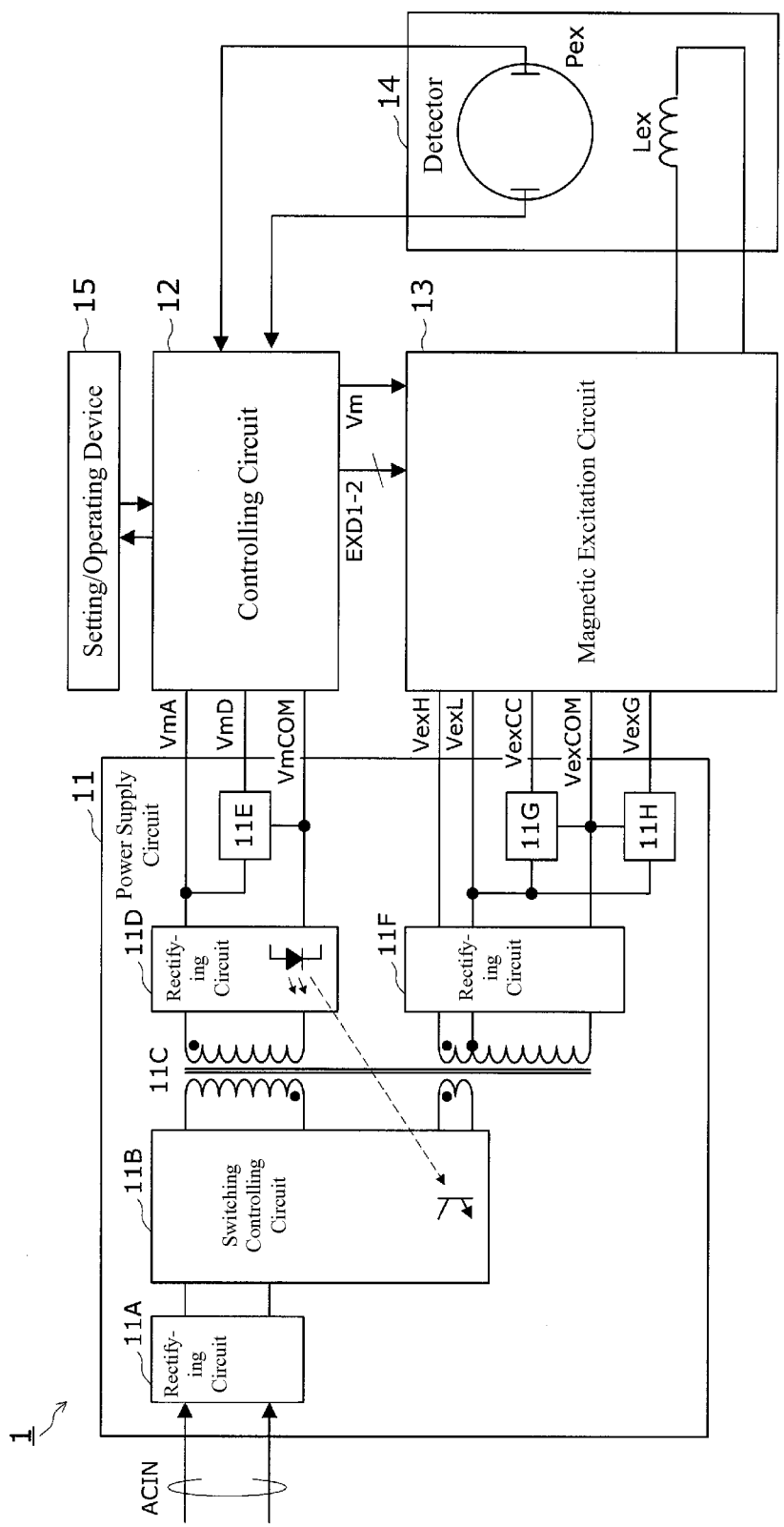
FIG. 11 is a block diagram illustrating the structure of an electromagnetic flow meter according to Further Example.
Figure 12:
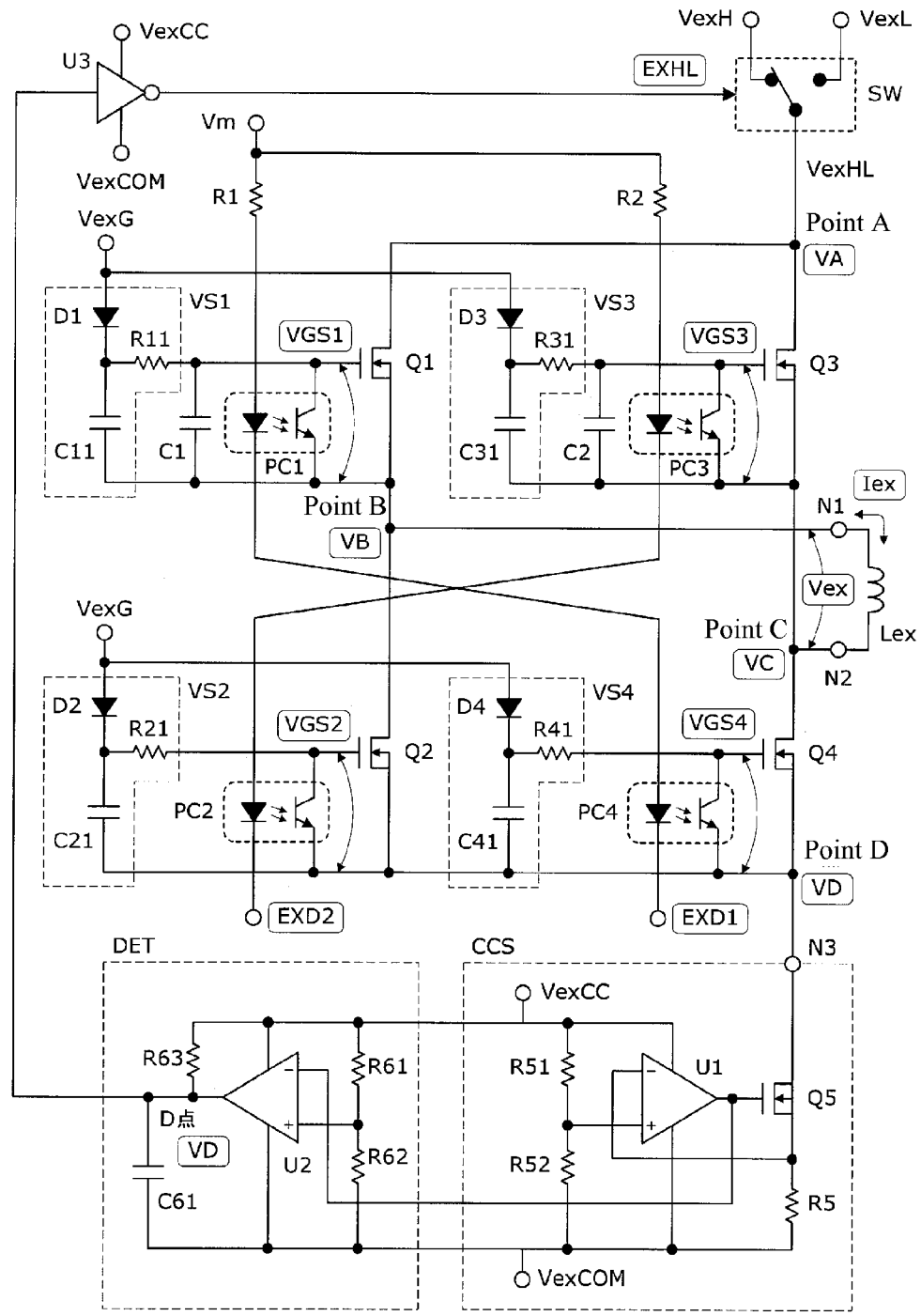
FIG. 12 is a circuit diagram illustrating a magnetic excitation circuit according to the Further Example.
Figure 13:
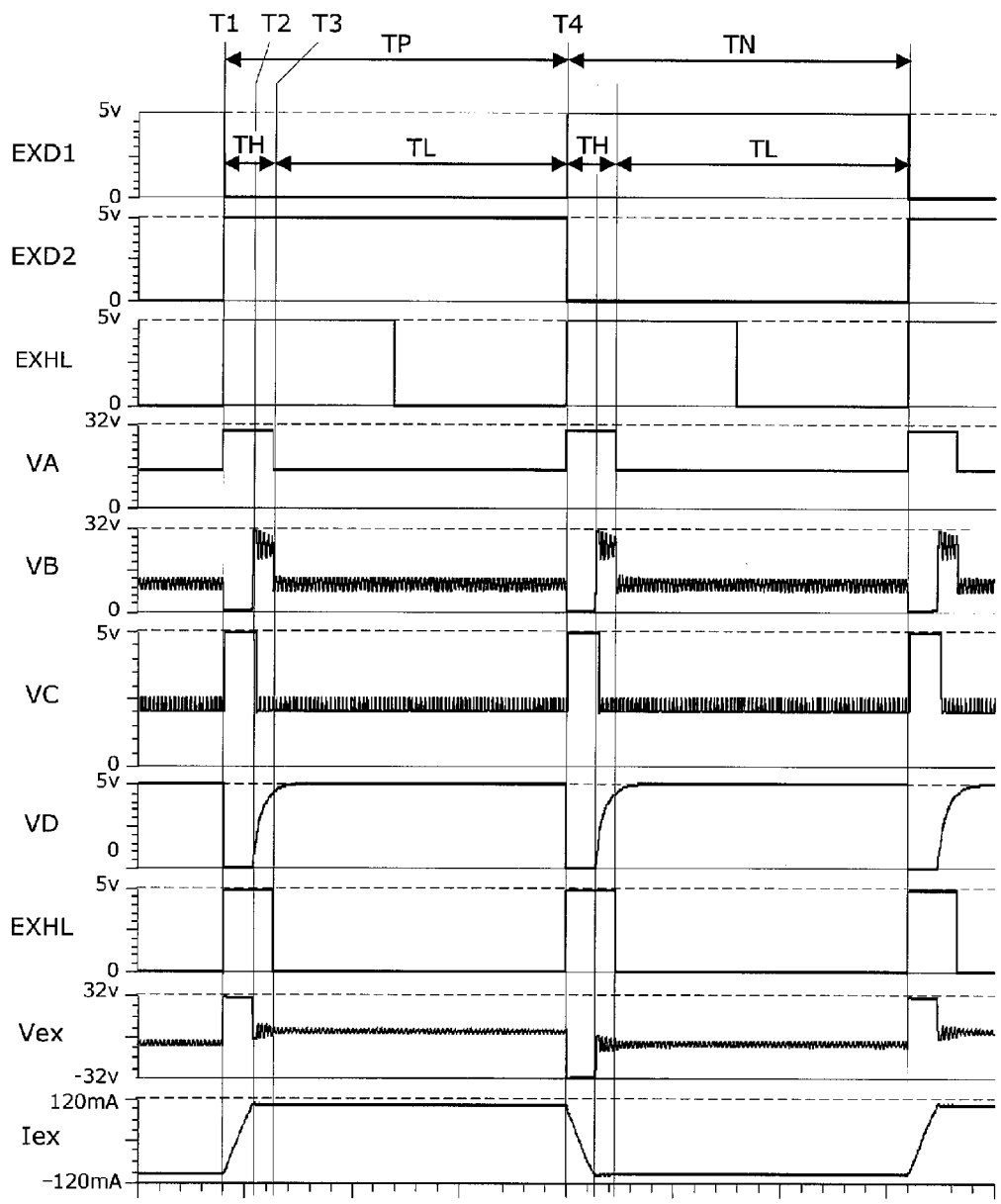
FIG. 13 is a signal waveform circuit illustrating the operation of the magnetic excitation circuit according to the Further Example.
Figure 14:
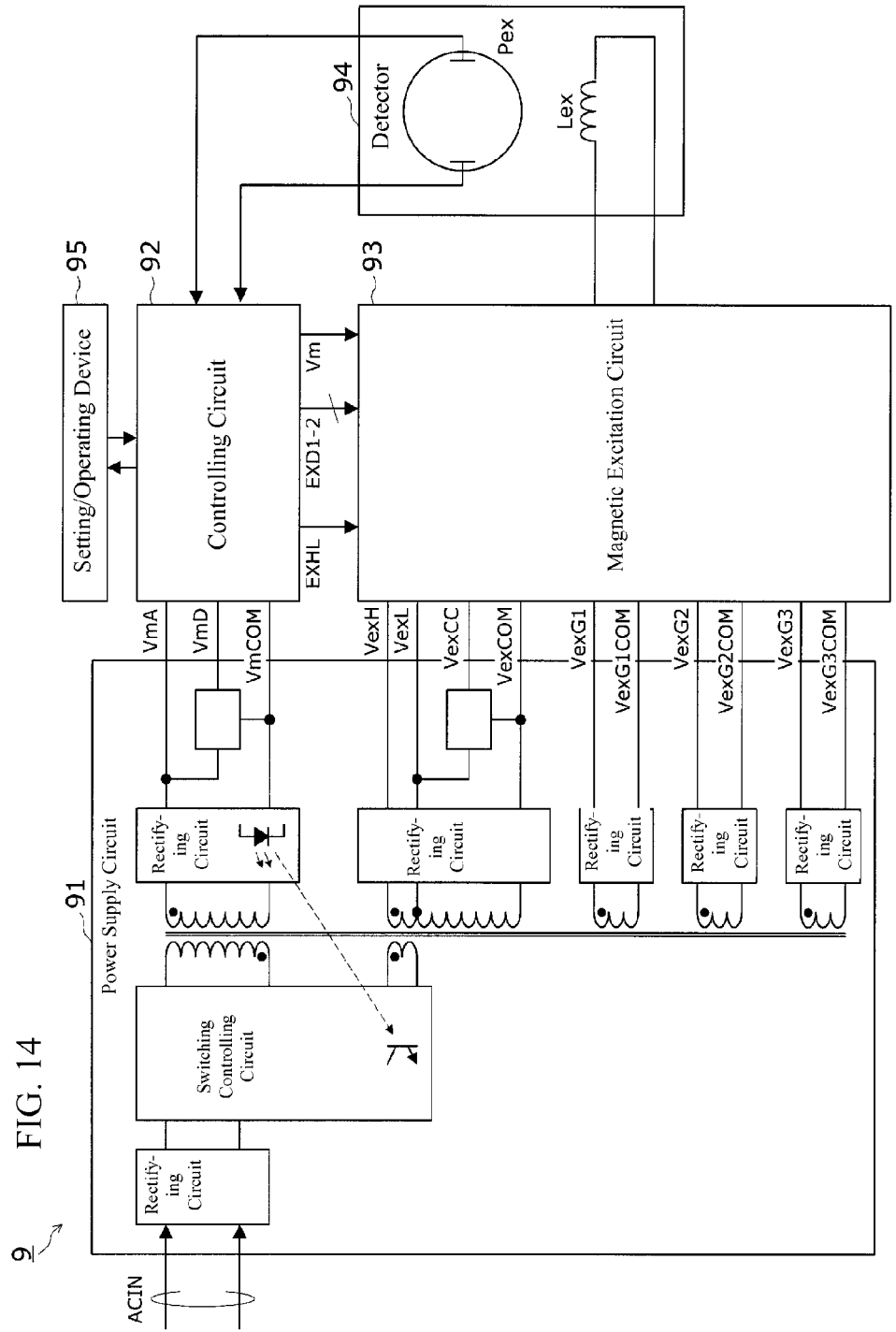
FIG. 14 is a block diagram illustrating the structure of a conventional electromagnetic flow meter.

Next an electromagnetic flow meter 1 according to Further Example according to the present invention will be explained in reference to FIG. 11 through FIG. 13. FIG. 11 is a block diagram illustrating a structure of an electromagnetic flow meter according to the Further Example. FIG. 12 is a circuit diagram illustrating a magnetic excitation circuit according to the Further Example. FIG. 13 is a signal waveform circuit illustrating the operation of the magnetic excitation circuit according to the Further Example.

In the Example and Another Example the explanation used, as an example, a case wherein the ratio of the high-voltage interval TH and the low-voltage interval TL was constant (50:50) regardless of the ramp-up of the magnetic excitation current Iex.

In the present example, the explanation will be for a case wherein, when the ramping up of the magnetic excitation current is detected after the start of the high-voltage interval TH, there is a switch to the low-voltage interval TL.

In the present example, rather than using the voltage switching signal EXD1 from the controlling circuit to the magnetic excitation circuit as illustrated in FIG. 11, instead, as illustrated in FIG. 12, a magnetic excitation current detecting circuit DET that detects the rise in the magnetic excitation current is provided.

U2 of the DET is a comparator that is actuated by the operating voltage VexCC and the ground electropotential VexCOM, where the non-inverting input terminal is connected to an electropotential wherein the voltage difference between VexCC and VexCOM is divided by resistive elements R61 and R62, and the inverting input terminal is connected to the output terminal of U1. The output terminal of U2 is connected to the input terminal of an inverter element U3, and connected to VexCC through a resistive element R63, and also connected to VexCOM through a capacitive element C61. Moreover, the output terminal of the inverter element U3 is connected to the switch SW, to connect to either VexH or VexL.

Operation of the Further Example

At time T1 immediately after switching the magnetic excitation polarity in the positive interval TP, the polarity of the magnetic excitation current Iex does not switch immediately, because of the inductance of the magnetic excitation coil Lex, and thus the output of U1 of the CCS (point C) goes to the maximum voltage (approximately 5 V, which is approximately VexCC), so Q5 goes to the fully ON state (where the drain-source resistance RDS is approximately 0Ω). Because of this, the output terminal of U2 of the DET, that is, point D, goes to an electropotential of essentially 0 V, and the output of the inverter terminal U3 goes to the high level to cause the magnetic excitation power supply voltage to go to the high voltage VexH, causing the ramp-up of the magnetic excitation current Iex to be faster.

Thereafter, over the interval wherein Iex is steadily increasing, until the setting value is reached, the output (point C) of U1 is maintained in its maximum voltage (approximately 5 V, which is approximately VexCC), and the output (point D) of U2 will be at the low level, so the magnetic excitation power supply voltage will continue in the high voltage VexH state.

After this, at time T2, when Iex reaches the setting value, the effects of U1 and Q5 act to perform constant current control, where the electropotential VC at point C drops and the output (open collector) of U2 inverts to enter a high impedance state, but the output of the inverter element U3 is maintained at the high level, by the delay circuit formed by R63 and C61 so that the magnetic excitation power supply voltage is maintained in the high voltage VexH state. As a result, the magnetic excitation power supply voltage stands by at the high voltage VexH, due to the delay circuit, until Iex reaches the setting value and is adequately stable.

Following this, at time T3, the C61 is charged and the electropotential VD at point D rises, and when the output of the inverter element U3 inverts, the magnetic excitation power supply voltage switches to the low voltage VexL.

Thereafter, the low-voltage interval TL continues until arriving at the negative interval TN at time T4, which is the timing with which the magnetic excitation polarity switches.

Thereafter, the operations, described above, for the positive interval TP and the operations for the negative interval TN are repeated alternatingly.

In this way, in the present example the rise of the magnetic excitation current is detected after the start of the high-voltage interval TH, and the switch to the low-voltage interval TL is after standing by until a stabilization time has elapsed, and thus the switching to the low-voltage interval TL is performed with the least possible time, without delaying the rise in the magnetic excitation current, thus suppressing the heating of Q5 in the constant current circuit CCS more than was the case in the Example and Another Example, making it possible to reduce the size of the heat dissipating device, such as a heat sink.

Moreover, there is also the effect that even when the magnetic excitation coil Lex is replaced due to a failure, or the like, there is no need to readjust the high-voltage interval TH and the low-voltage interval TL depending on the inductance value or DC resistance value of the Lex after the replacement.

Expanded Examples

While the present invention was explained above in reference to the examples, the present invention is not limited by the examples set forth above. The structures and details of the present invention may be modified in a variety of ways, as can be understood by those skilled in the art, within the scope of the present invention. Moreover, the present invention may be embodied through combining the various examples, insofar as there are no contradictions.

The invention claimed is:

1. A magnetic excitation circuit used as a circuit for providing a magnetic excitation electric current based on a magnetic excitation power supply voltage to a magnetic excitation coil of an electromagnetic flow meter, wherein the magnetic excitation electric current is switched to positive polarity/negative polarity with each positive interval/negative interval that are repeated with a specific period, where, at the times of the beginnings of these positive interval and negative interval the magnetic excitation power supply voltage is switched to a high voltage during a high-voltage interval, and after a specific time interval has elapsed after the starting time, the magnetic excitation power supply voltage is switched to a low voltage over a low-voltage interval, the magnetic excitation circuit comprising:
   first and fourth switching elements that provide a magnetic excitation electric current that is switched to a positive polarity through turning ON during the positive interval and turning OFF during the negative interval, wherein a first delaying capacitive element, which delays the first switching element turning ON, is connected between a control terminal and an output terminal of the first switching element;
   second and third switching elements that provide a magnetic excitation electric current that is switched to a negative polarity through turning OFF during the positive interval and turning ON during the negative interval, wherein a second delaying capacitive element, which delays the third switching element turning ON, is connected between a control terminal and an output terminal of the third switching element;
   a constant current circuit that controls the magnetic excitation electric current to a specific value; and
   voltage storing circuits, which store and output a driving voltage that is charged by a common driving voltage, connected individually between the respective controlling terminals and output terminals of the first through fourth switching elements to enable operation by a driving voltage that is outputted from the respective voltage storing circuits when the first through fourth switching elements are turned ON with the positive interval/negative interval.

2. A magnetic excitation circuit used as a circuit for providing a magnetic excitation electric current based on a magnetic excitation power supply voltage to a magnetic excitation coil of an electromagnetic flow meter, wherein the magnetic excitation electric current is switched to positive polarity/negative polarity with each positive interval/negative interval that are repeated with a specific period, where, at the times of the beginnings of these positive interval and negative interval the magnetic excitation power supply voltage is switched to a high voltage during a high-voltage interval, and after a specific time interval has elapsed after the starting time, the magnetic excitation power supply voltage is switched to a low voltage over a low-voltage interval, the magnetic excitation circuit comprising:
   first and fourth switching elements that provide a magnetic excitation electric current that is switched to a positive polarity through turning ON during the positive interval and turning OFF during the negative interval;
   second and third switching elements that provide a magnetic excitation electric current that is switched to a negative polarity through turning OFF during the positive interval and turning ON during the negative interval;
   a constant current circuit that controls the magnetic excitation electric current to a specific value;
   voltage storing circuits, which store and output a driving voltage that is charged by a common driving voltage, connected individually between the respective controlling terminals and output terminals of the first through fourth switching elements to enable operation by a driving voltage that is outputted from the respective voltage storing circuits when the first through fourth switching elements are turned ON with the positive interval/negative interval;
   a charging capacitive element that is connected in common to the input terminals of the first and third switching elements, and provides, as the high voltage, a charge voltage obtained by charging by a reverse electromotive force that is produced in the magnetic excitation coil at the time of switching of the polarity of the magnetic excitation electric current; and
   a reverse flow preventing diode, wherein
   the anode terminal is connected to the magnetic excitation power supply voltage and the cathode terminal is connected in common to the input terminals of the first and third switching elements, to prevent reverse flow of the reverse electromotive force to the magnetic excitation power supply voltage, and to provide, to the input terminals of the first and third switching elements, the magnetic excitation power supply voltage in response to a drop in the charging voltage.

* * * * *